US012088050B2

(12) United States Patent
Regnier

(10) Patent No.: US 12,088,050 B2
(45) Date of Patent: Sep. 10, 2024

(54) PLUG ASSEMBLY AND RECEPTACLE ASSEMBLY WITH TWO ROWS

(71) Applicant: Molex, LLC, Lisle, IL (US)

(72) Inventor: Kent E. Regnier, Lombard, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/137,450

(22) Filed: Apr. 21, 2023

(65) Prior Publication Data

US 2023/0253743 A1 Aug. 10, 2023

Related U.S. Application Data

(63) Continuation of application No. 16/194,606, filed on Nov. 19, 2018, now Pat. No. 11,641,082, which is a (Continued)

(51) Int. Cl.

| | |
|---|---|
| ***H01R 25/00*** | (2006.01) |
| ***H01R 12/72*** | (2011.01) |
| ***H01R 12/75*** | (2011.01) |
| ***H01R 13/11*** | (2006.01) |
| ***H01R 13/502*** | (2006.01) |

(Continued)

(52) U.S. Cl.

CPC ......... *H01R 25/003* (2013.01); *H01R 12/721* (2013.01); *H01R 12/75* (2013.01); *H01R 13/113* (2013.01); *H01R 13/6581* (2013.01); *H01R 13/502* (2013.01); *H01R 13/6587* (2013.01); *H01R 24/60* (2013.01)

(58) Field of Classification Search

CPC ....................... H01R 23/7073; H01R 23/6873; H01R 23/02; H01R 24/60; H01R 24/62; H01R 25/003; H01R 12/721; H01R 12/75; H01R 13/6581; H01R 13/113; H01R 13/502; H01R 13/6587; H01L 23/4006

USPC ...................................... 439/541.5, 660, 485

See application file for complete search history.

(56) References Cited

U.S. PATENT DOCUMENTS 4,298,237 A 11/1981 Griffith et al.
4,548,452 A 10/1985 Gillett
(Continued)

FOREIGN PATENT DOCUMENTS

CN 1375120 A 10/2002
CN 201540991 U 8/2010
(Continued)

OTHER PUBLICATIONS

International Preliminary Report on Patentability received for PCT Application No. PCT/US2016/053266, mailed on Apr. 5, 2018, 11 pages.

(Continued)

*Primary Examiner* — Gary F Paumen

(57) ABSTRACT

A connector system for a pluggable IO connector is disclosed that includes a plug with two rows of pads on two sides of a mating blade and a receptacle with two connection regions that is configured to engage the two rows of pads. In an embodiment the connector system can support double the data bandwidth of a typical connector, such as a QSFP connector, while allowing for backward compatibility with convention plug assemblies that have a single row of pads on each side the mating blade.

20 Claims, 42 Drawing Sheets

Related U.S. Application Data continuation of application No. 15/761,870, filed as application No. PCT/US2016/053266 on Sep. 23, 2016, now Pat. No. 10,396,513.

(60) Provisional application No. 62/222,310, filed on Sep. 23, 2015.

(51) Int. Cl.

| | |
|---|---|
| ***H01R 13/6581*** | (2011.01) |
| ***H01R 13/6587*** | (2011.01) |
| ***H01R 24/60*** | (2011.01) |

(56) References Cited

U.S. PATENT DOCUMENTS

| | | | |
|---|---|---|---|
| 4,560,221 | A | 12/1985 | Olsson |
| 4,598,966 | A | 7/1986 | Boland |
| 4,806,103 | A | 2/1989 | Kniese et al. |
| 5,024,609 | A | 6/1991 | Piorunneck |
| 5,051,099 | A | 9/1991 | Pickles et al. |
| 5,057,028 | A | 10/1991 | Lemke et al. |
| 5,074,039 | A | 12/1991 | Hillbish et al. |
| 5,110,309 | A | 5/1992 | Ichitsubo |
| 5,239,748 | A | 8/1993 | Hamilton |
| 5,425,651 | A | 6/1995 | Thrush et al. |
| 5,986,880 | A | 11/1999 | Santeler et al. |
| 6,074,228 | A | 6/2000 | Berg et al. |
| 6,203,328 | B1 | 3/2001 | Ortega et al. |
| 6,589,061 | B1 | 7/2003 | Korsunsky et al. |
| 6,645,009 | B1 | 11/2003 | Billman et al. |
| 7,128,596 | B2 | 10/2006 | Masaki et al. |
| 7,204,717 | B2 | 4/2007 | Chang et al. |
| 7,453,338 | B2 | 11/2008 | Aronson |
| 7,798,820 | B2 | 9/2010 | Hong |
| 7,828,560 | B2 | 11/2010 | Wu et al. |
| 7,845,975 | B2 | 12/2010 | Cheng et al. |
| 7,963,799 | B1 | 6/2011 | Lee et al. |
| 8,292,669 | B2 | 10/2012 | Wang et al. |
| 8,353,707 | B2 | 1/2013 | Wang et al. |
| 8,353,728 | B2 | 1/2013 | Wang et al. |
| 8,500,488 | B2 | 8/2013 | Hsu et al. |
| 8,506,333 | B2 | 8/2013 | Wang et al. |
| 8,614,398 | B2 | 12/2013 | Regnier et al. |
| 8,690,608 | B2 | 4/2014 | Naito et al. |
| 8,696,389 | B2 | 4/2014 | Mason et al. |
| 8,727,793 | B2 | 5/2014 | Cafiero et al. |
| 8,858,237 | B2 | 10/2014 | Hsu et al. |
| 8,944,830 | B2 | 2/2015 | Little et al. |
| 9,011,177 | B2 | 4/2015 | Lloyd et al. |
| 9,065,225 | B2 | 6/2015 | Degner et al. |
| 9,136,236 | B2 | 9/2015 | Starkston et al. |
| 9,806,476 | B2 | 10/2017 | Long |
| 10,396,513 | B2 * | 8/2019 | Regnier ............... H01R 12/721 |
| 11,641,082 | B2 * | 5/2023 | Regnier ............ H01R 13/6581 439/485 |
| 2003/0203676 | A1 | 10/2003 | Hasircoglu |
| 2004/0072467 | A1 | 4/2004 | Jordan et al. |
| 2005/0032429 | A1 | 2/2005 | Hull et al. |
| 2006/0166551 | A1 | 7/2006 | Korsunsky et al. |
| 2007/0072457 | A1 | 3/2007 | Hamazaki |
| 2011/0223805 | A1 | 9/2011 | Regnier et al. |
| 2012/0156938 | A1 | 6/2012 | Zhang |
| 2013/0115815 | A1 | 5/2013 | Lim et al. |
| 2013/0189856 | A1 | 7/2013 | Ko et al. |
| 2013/0196553 | A1 | 8/2013 | Gailus |
| 2013/0273781 | A1 | 10/2013 | Buck et al. |
| 2013/0344745 | A1 | 12/2013 | Nichols |
| 2014/0021802 | A1 | 1/2014 | Liu et al. |
| 2014/0071646 | A1 | 3/2014 | Qian et al. |
| 2014/0227898 | A1 | 8/2014 | Zhang |

FOREIGN PATENT DOCUMENTS

| | | | |
|---|---|---|---|
| CN | 102165348 | A | 8/2011 |
| CN | 203660183 | U | 6/2014 |
| EP | 0627792 | A1 | 12/1994 |
| EP | 0676833 | A2 | 10/1995 |
| EP | 0877448 | A2 | 11/1998 |
| JP | S587477 | U | 1/1983 |
| JP | S5870688 | U | 5/1983 |
| JP | H02204983 | A | 8/1990 |
| JP | H0377285 | A | 4/1991 |
| JP | H046185 | U | 1/1992 |
| JP | H04249082 | A | 9/1992 |
| JP | H0718387 | U | 3/1995 |
| JP | H1010588 | A | 1/1998 |
| JP | 2006324195 | A | 11/2006 |
| TW | 574772 | B | 2/2004 |
| WO | 2008012428 | A2 | 1/2008 |
| WO | 2012027679 | A2 | 3/2012 |
| WO | 2015021221 | A1 | 2/2015 |
| WO | 2017053675 | A1 | 3/2017 |

OTHER PUBLICATIONS

International Search Report and Written Opinion received for PCT application No. PCT/US2016/053266, mailed on Dec. 28, 2016, 12 pages.

Non-Final Rejection received for U.S. Appl. No. 16/194,606, mailed on Jan. 13, 2020, 6 pages.

Non-Final Rejection received for U.S. Appl. No. 16/194,606, mailed on Mar. 8, 2019, 6 pages.

* cited by examiner

PLUG ASSEMBLY AND RECEPTACLE ASSEMBLY WITH TWO ROWS

CROSS REFERENCE TO RELATED APPLICATIONS

This application is a continuation of U.S. patent application Ser. No. 16/194,606 filed on Nov. 19, 2018 which in turn is a continuation of U.S. patent application Ser. No. 15/761,870, filed Mar. 21, 2018, which in turn is a national stage of International Application No. PCT/US2016/053266, filed Sep. 23, 2016, which claims priority to U.S. Application No. 62/222,310, filed Sep. 23, 2015, all of which are incorporated herein by reference in their entireties.

TECHNICAL FIELD

This disclosure relates to the field of input/output ("IO") connectors, more specifically to the field of high data-rate capable IO connectors.

DESCRIPTION OF RELATED ART

IO connectors are commonly used to support network and server applications. Known IO connectors include SFP, QSFP, CXP and XFP style connectors, just to name a few. One issue that has resulted from the existing styles of connectors is that each style is popular for particular applications. SFP connectors are 1× connectors (supporting one transmission channel and one receive channel) and suitable for applications where a single channel of communication is sufficient. CXP is a 12× connector and is desirable when many more channels of communication are needed. QSFP is a 4× connector and thus is a popular choice for many applications as it provides sufficient bandwidth and front panel density to meet a wide range of applications. Thus QSFP connectors have become a preferred style for number of applications. An embodiment of a QSFP-style plug assembly 10 (as shown in FIG. 1) includes a cable 15 connected to a body 20 that includes a top flange 21 and a bottom flange 22. The top and bottom flanges 21, 22 help protect a mating blade 23 that is typically formed as a circuit board and the cable 15 can include wires that are terminated to the mating blade 23 in a conventional manner.

While QSFP style connectors are suitable for many applications, it would be desirable to offer greater front panel density. New connector designs at smaller pitches are being proposed and should help satisfy these needed in a wide range of applications. However, a substantial number of cable assemblies, including passive and active cable assemblies, exist for the QSFP style connector and it would be beneficial to avoid the need to scrap prior designs. Accordingly, certain individuals would appreciate a way to offer increased front panel density while maintaining compatibility with existing QSFP designs.

SUMMARY

A receptacle assembly is disclosed that includes a connector inside a cage. The connector includes a first connection region and a second connection region and each connection region includes opposing rows of terminals. One of connection regions can be configured to mate with a single row of pads and be compatible with the mating blade of a standard connector. The combination of the first and second connection regions can be configured to mate with a higher density plug assembly that includes mating blade configured with two rows of pads. The receptacle assembly can be stacked and provide two ports and each port can include a module that supports two connection regions. The cage can be configured to airflow through the cage so as to improve cooling of any inserted plug assemblies.

A plug assembly is disclosed that includes a body with a top flange, a bottom flange and a mating blade positioned between the two flanges. A first row and a second row of pads can be provided on two sides of the mating blade. The top flange has a bottom surface that faces toward the circuit card and includes first and second level, the first level being closer to the mating blade than the second level. The bottom flange that is substantially shorter than a circuit card and can be configured so that the bottom flange covers one row of pads while not covering the second.

In operation, the connector system can provide backward compatibility between the receptacle assembly and existing plug assemblies while enabling higher density connections between the receptacle assembly and plug assembly configured for increased data throughput. In some embodiments the connector system can be a QSFP style connector.

BRIEF DESCRIPTION OF THE DRAWINGS

The present disclosure is illustrated by way of example and not limited in the accompanying figures in which like reference numerals indicate similar elements and in which.

DETAILED DESCRIPTION OF THE PREFERRED EMBODIMENTS

Figure 1:
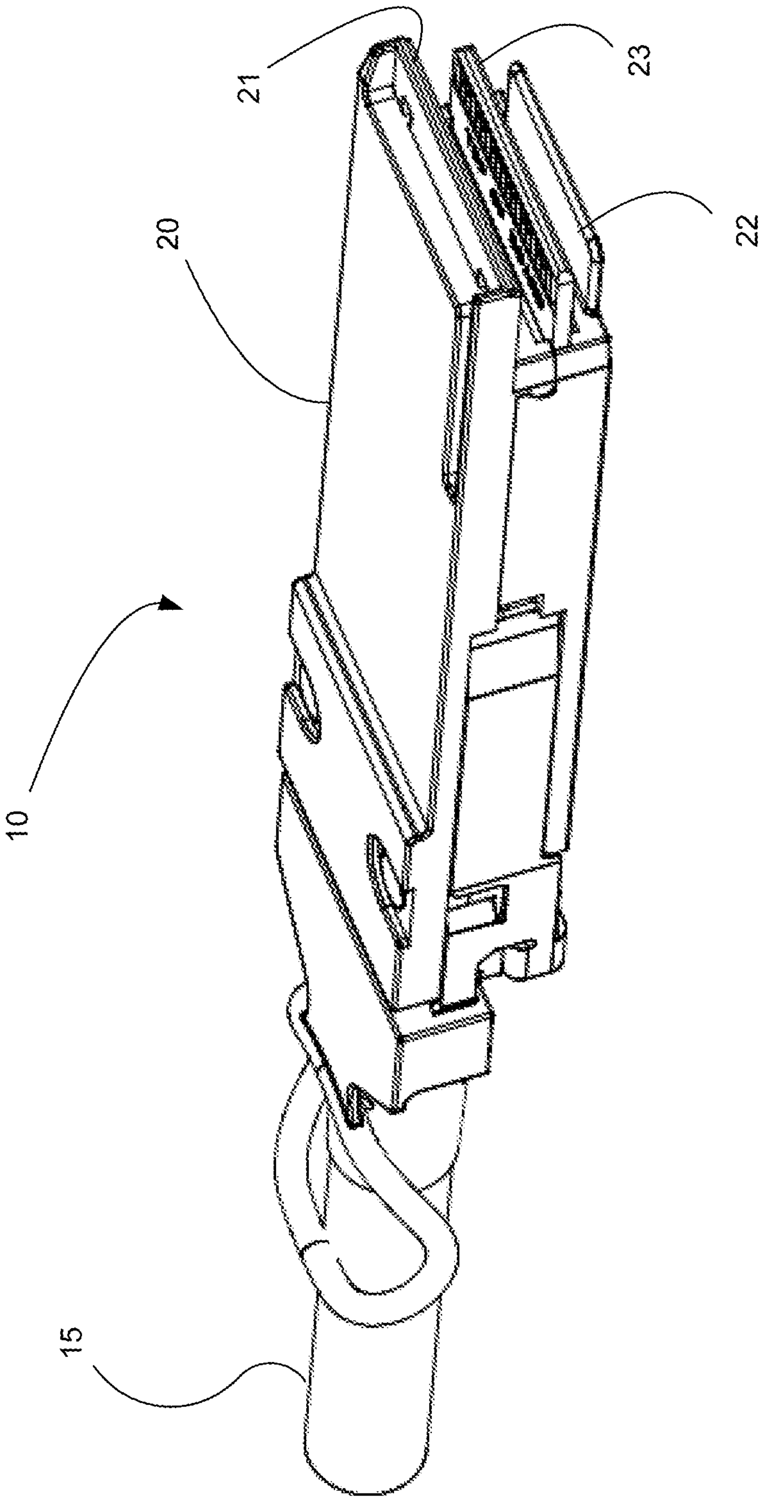
Fig. 1 (Prior Art)
FIG. 1 illustrates an embodiment of a prior art QSFP style plug assembly.
Figure 2:
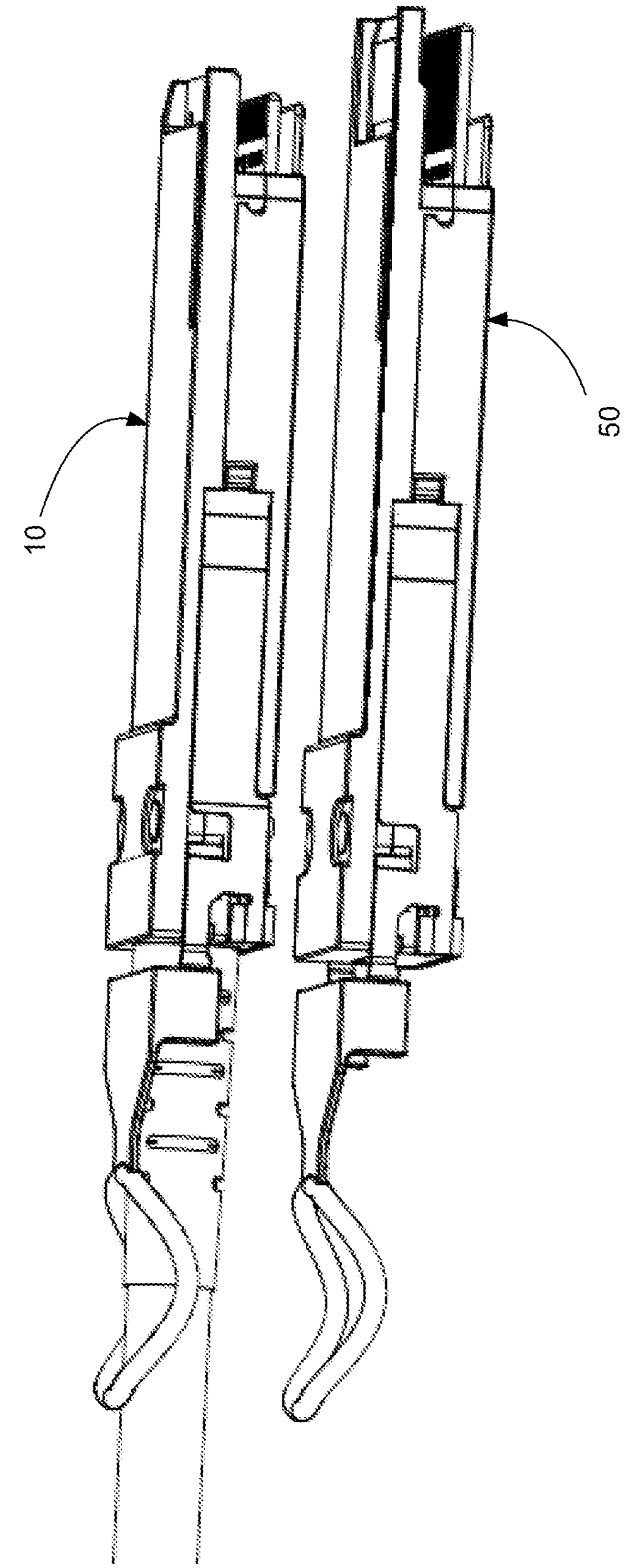
FIG. 2 illustrates a perspective view of two plug assemblies.
Figure 3:
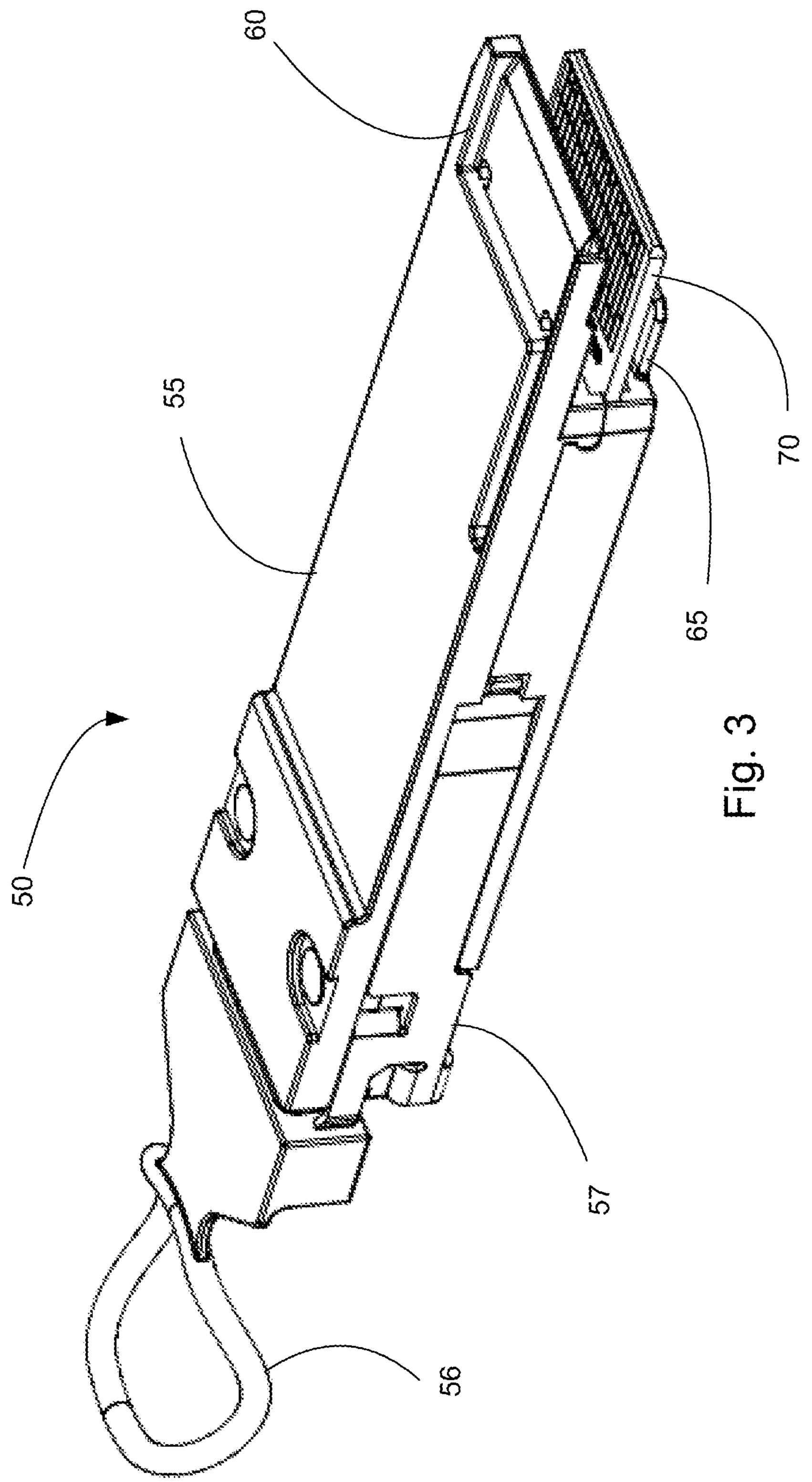
FIG. 3 illustrates a perspective view of an embodiment of a plug assembly.
Figure 4:
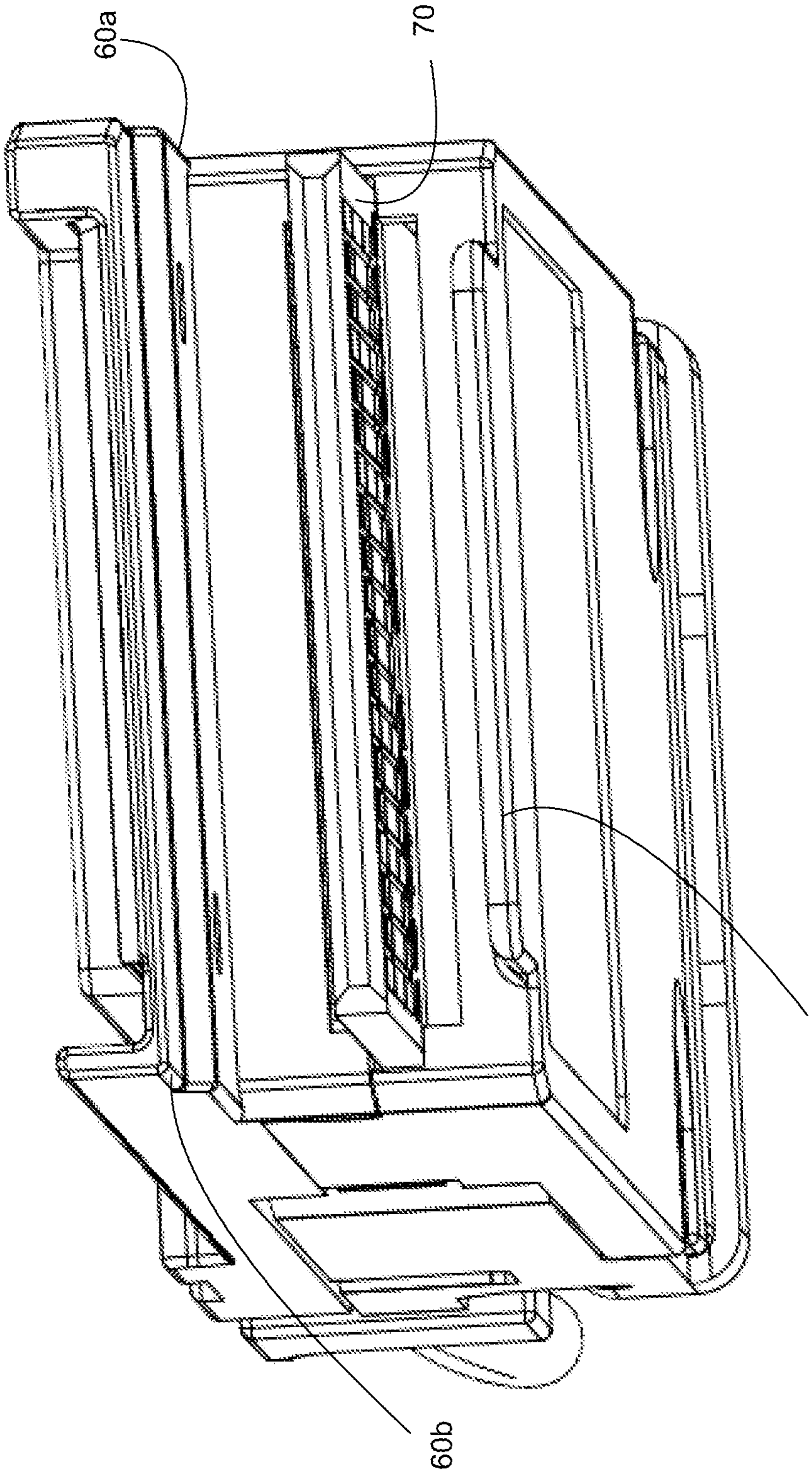
FIG. 4 illustrates another perspective view of the embodiment depicted in FIG. 3.
Figure 5:
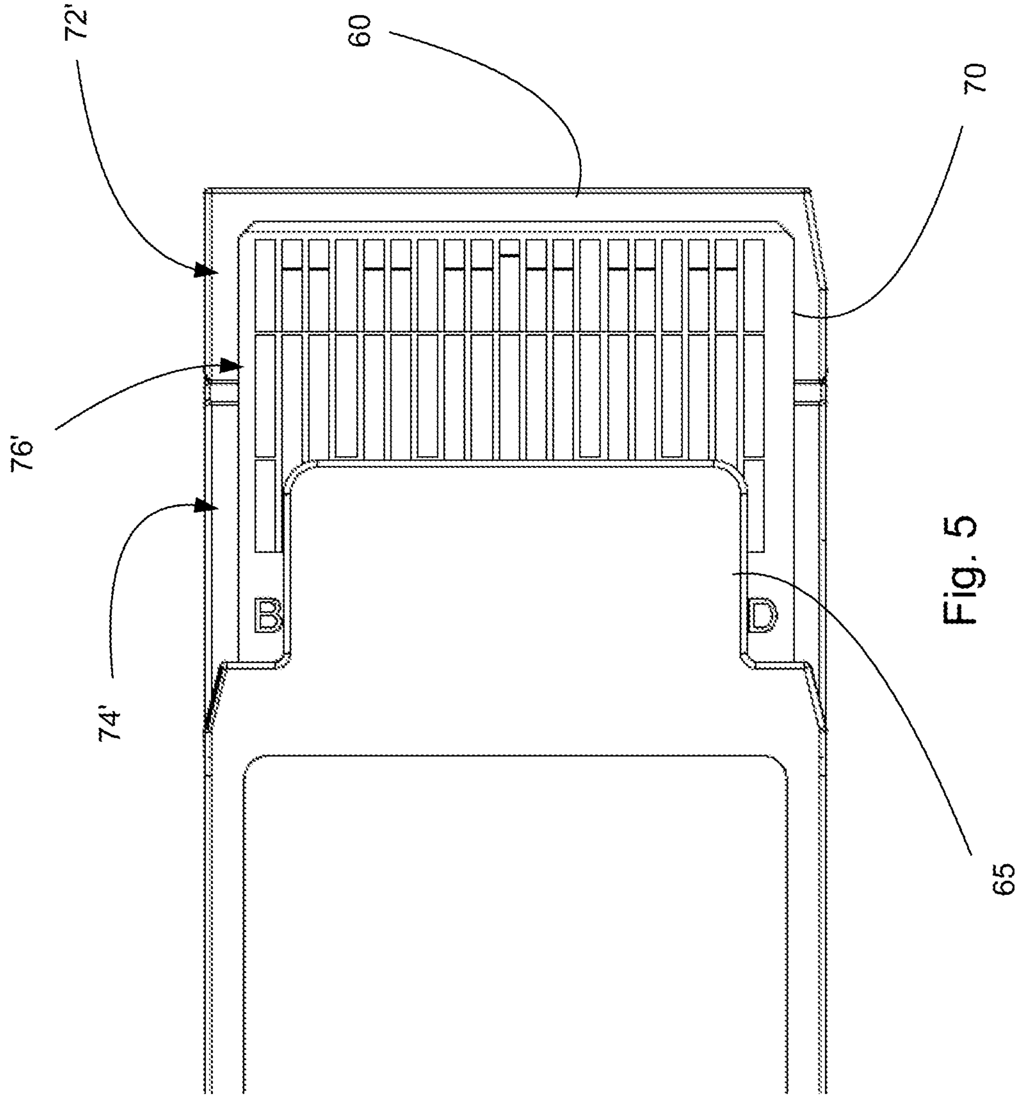
FIG. 5 illustrates a bottom view of an end of an embodiment of a plug connector.
Figure 6:
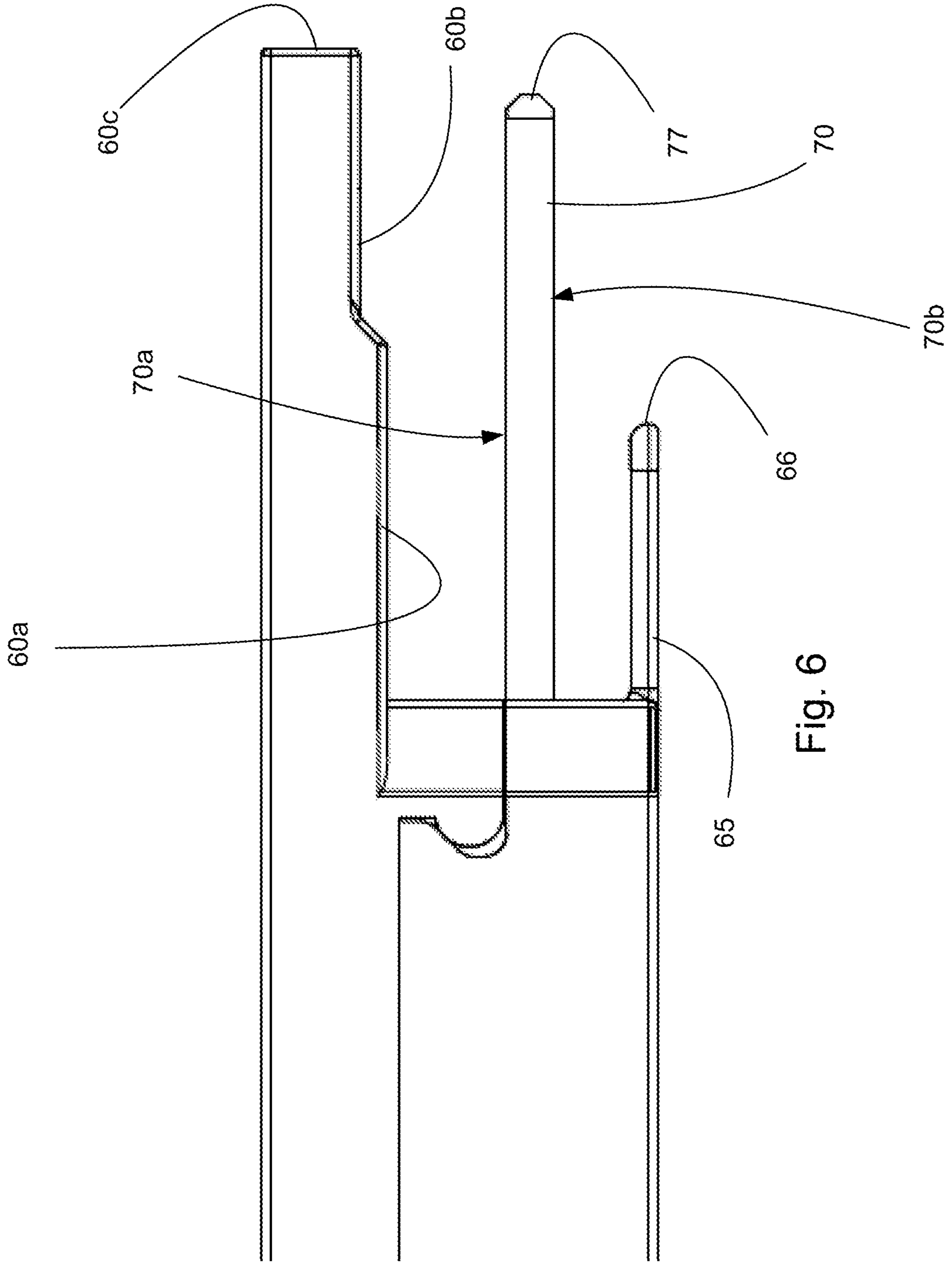
FIG. 6 illustrates an elevated side view of the embodiment depicted in FIG. 5.
Figure 7:
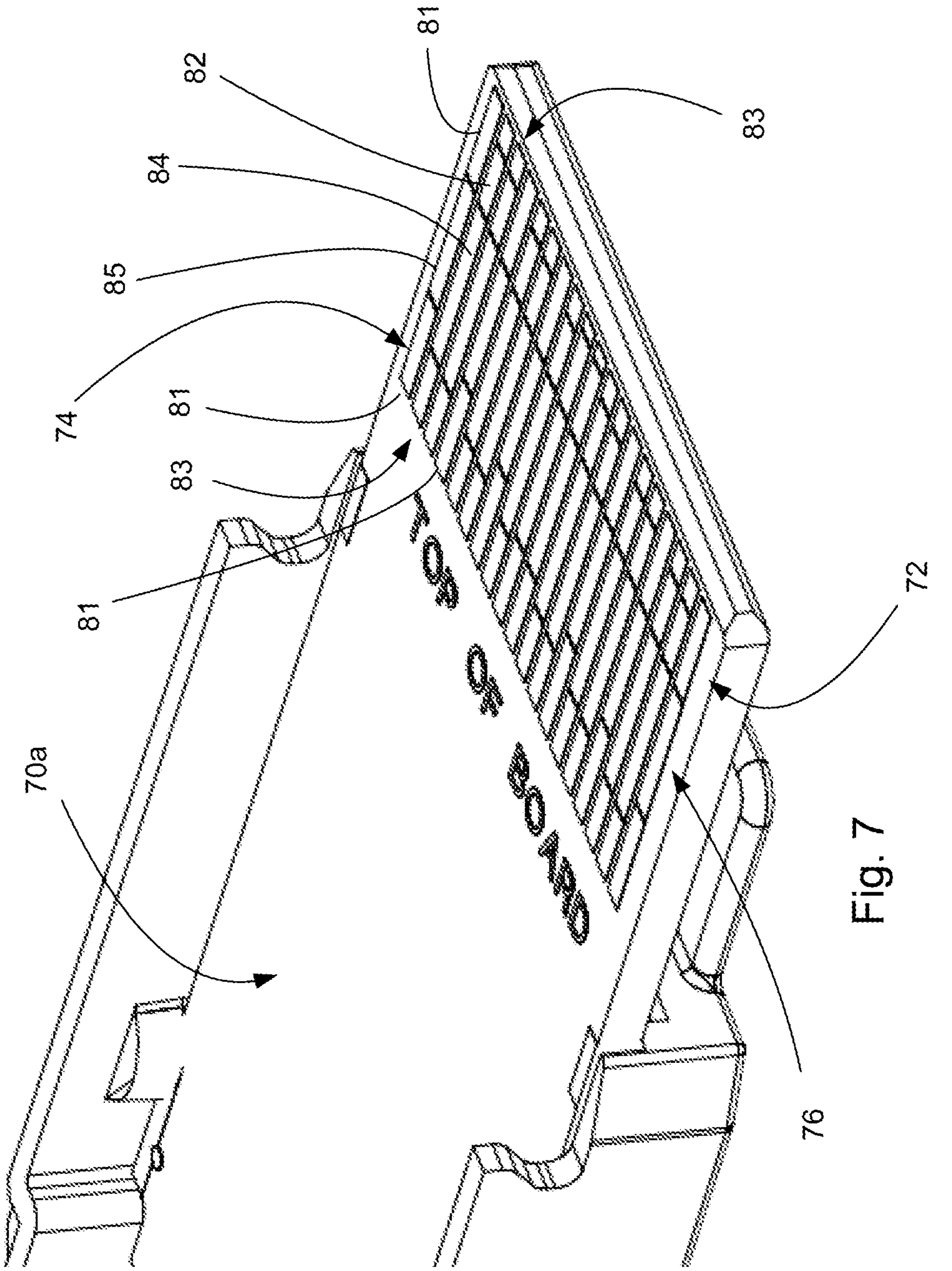
FIG. 7 illustrates a perspective simplified view of an embodiment of a plug assembly.
Figure 8:
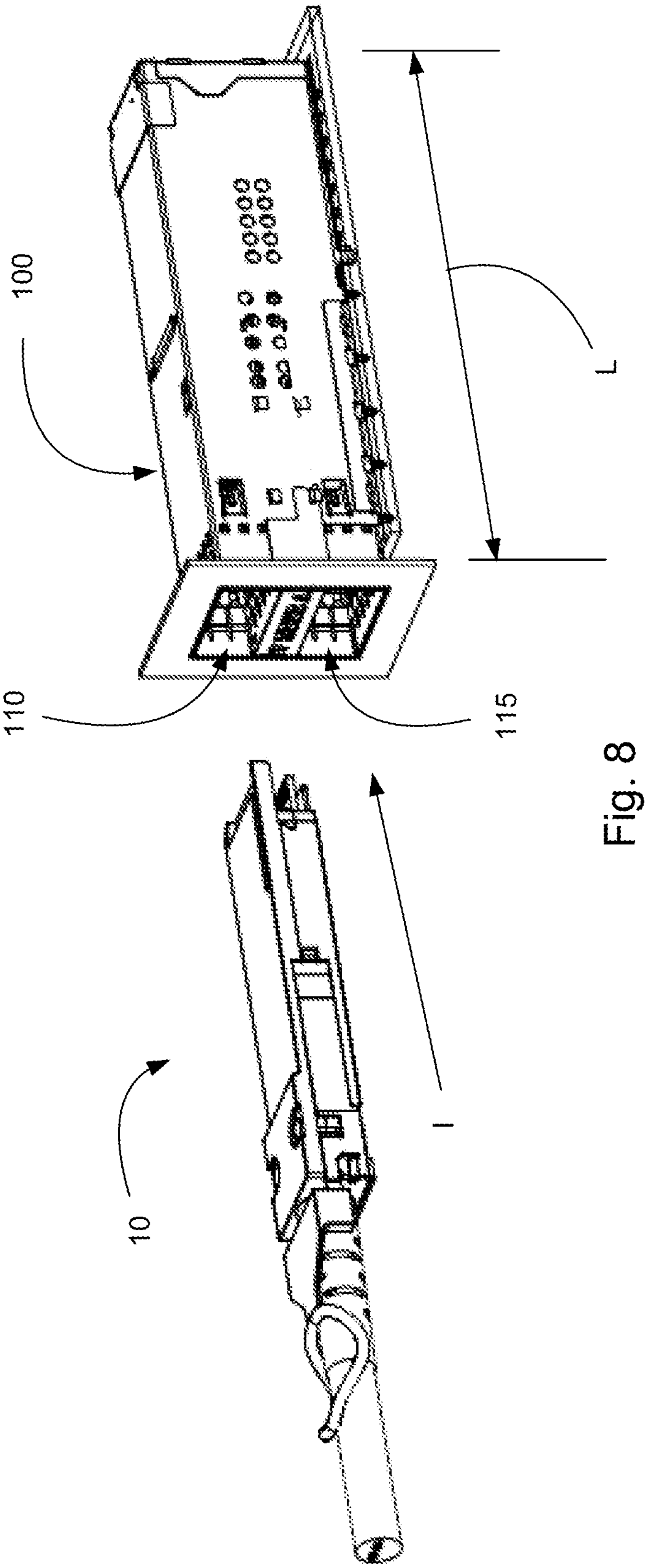
FIG. 8 illustrates a perspective partially exploded view of a connector system.
Figure 9:
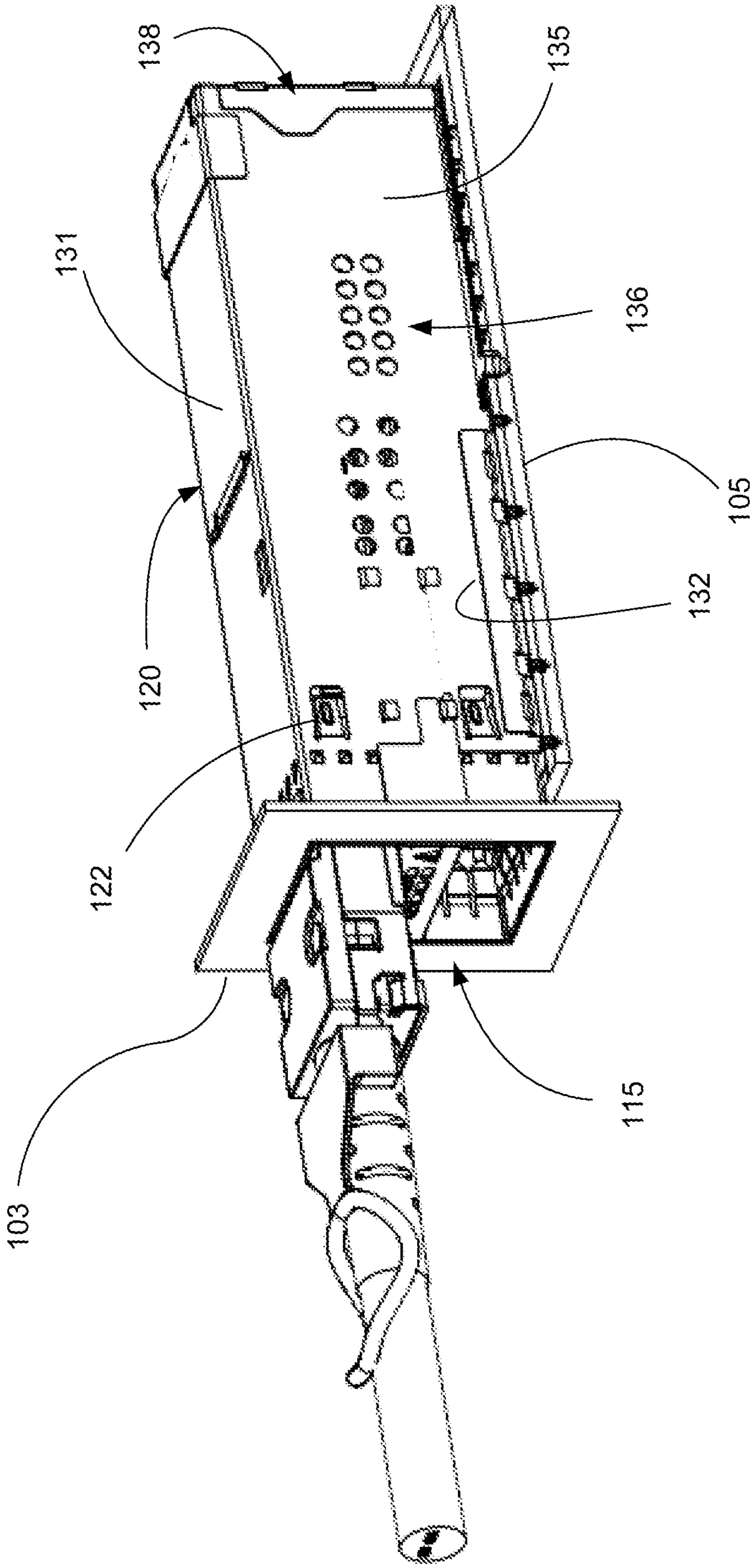
FIG. 9 illustrates a perspective view of the embodiment depicted in FIG. 8 with the plug assembly inserted into the receptacle assembly.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The disclosed embodiments illustrates features that can be included in a high density QSFP style connector system. As can be appreciated, while a stacked receptacle assembly is disclosed that includes a top port and a bottom port, a single port connector could also be provided. In addition, ganged version could also be provided by increasing the number of connectors depicted and creating a cage that had two or more ports arranged side by side. It should be noted that while the depicted embodiment is configured to be compatible with a QSFP style connector, this disclosure is not so limited. Other known standards, such as SFP or XSFP or new standards would also be compatible with the features and discussion provided herein and the style of connector is not intended to be limiting unless otherwise noted.

As can be appreciated, the receptacle assembly includes a two-part housing. A first set of wafers support vertical terminals. The vertical terminals include tails but do not include contacts. A second set of wafers support horizontal terminals. The horizontal terminals include contacts but do not include tails. The first and second sets of wafers are pressed together so that there is an electrical connection between the tails and the contacts.

The system is designed so that it supports 25 Gbps data rates for each differential channel and thus offers the ability to support 200 Gbps systems, compared to existing QSFP systems that can support 100 Gbps with a 25 Gbps differential channel.

As can be appreciated, the receptacle assembly is configured to improve air flow so that the system can be cooled while still supporting light pipes. A center member includes an open channel that allows air to flow between a top and bottom port. The center member includes a center divider and apertures in two side walls. A back wall of a cage can includes apertures that allow air to flow in (or out, depending on whether the airflow is front-to-back or back-to-front) of the connector in an efficient manner.

Turning to FIGS. 2-7, a plug assembly 50 is disclosed. The plug assembly 50 includes a body 55 that supports a release member 56 that is connected to a latching system 57. Translation of the release member 56 causes the latching system 57 to actuate. The body 55 includes a top flange 60 with a front end 60*c*, a bottom flange 65 with a front end 66 and a mating blade 70 with a front end 77 that is positioned between the top flange 60 and the bottom flange 65. As can be appreciated, the top flange 60 can include notches and can be configured to have a particular shape so as to mate with a corresponding receptacle assembly system. Thus, the depicted shape is not required and can be modified as desired.

The top flange 60 includes a first lower surface 60*a* and a second lower surface 60*b* and the first lower surface 60*b* is offset from the second lower surface 60*b*. Thus the first distance between the first lower surface 60*a* and the mating blade 70 is less than a second distance between the second lower surface 60*b* and the mating blade.

The mating blade 70 includes a top surface 70*a* that supports a first pad row 72, a second pad row 74 and a third pad row 76 that are positioned between the first and second rows of pads 72, 74. The mating blade 70 also includes a bottom surface 70*b* that supports a fourth pad row 72', a fifth pad row 74' and a sixth pad row 76' that are positioned between the first and second rows of pads 72', 74'. As can be appreciated, the fourth, fifth and sixth pad rows can be arranged the same as the first, second and third pad rows but are positioned on the opposite side of the mating blade 70. In an embodiment the top flange 60 can cover the first, second and third pad rows 72, 74, 76 and can extend past the front end 77 while the bottom flange 65 covers just the fifth pad row 74' on the bottom. While not required, one potential advantage of such a configuration is that it allow the plug assembly to be interchangeable with a system that allows for two different plug assemblies to be alternatively inserted into the same port, as will be disclosed below.

The first row 72 include short pads 82 that can be configured as signal pads for higher data rates and longer pads 81 that can be used as ground pads or low data rate pads. As shown, the short pads 82 are arranged so as to provide a differential pair 83. In operation, the first pad row 72 will slide past a second connection region 174 and mate with a first connection region 172 while the second pad row 74 mate with the second connection region (as will be discussed below). To ensure the connection with the first and second connection regions 172, 174 are reliable it has been determined beneficial to include the third pad row 76 to protect the first connection region. The third pad row 76 can include long pads 84 positioned between two pairs of short pads and further include intermediate pads 85 positioned between long pads 81. Naturally, the depicted configuration is intended to have the first pad row 72 and second pad row 74 be configured substantially the same. If such a configuration is not required then the third pad row 76 may have a different configuration of pads. Regardless, it is preferred that the pads in the third pad row 76 be longer than the short pads 82 in the first and second pad rows 72, 74 so as to ensure good electrical separation between the first and second pad rows 72, 74.

It should be noted that the plug assembly is depicted as a copper-based configuration but could readily be provided as a copper/optical solution (e.g., a transceiver). In such a configuration the internal part of the plug would include a desired optical engine (such as is available from OPLINK or other providers) and would convert the copper signals to optical signals and would be configured to transmit those optical signals over optical fibers, as is known.

Figure 10:
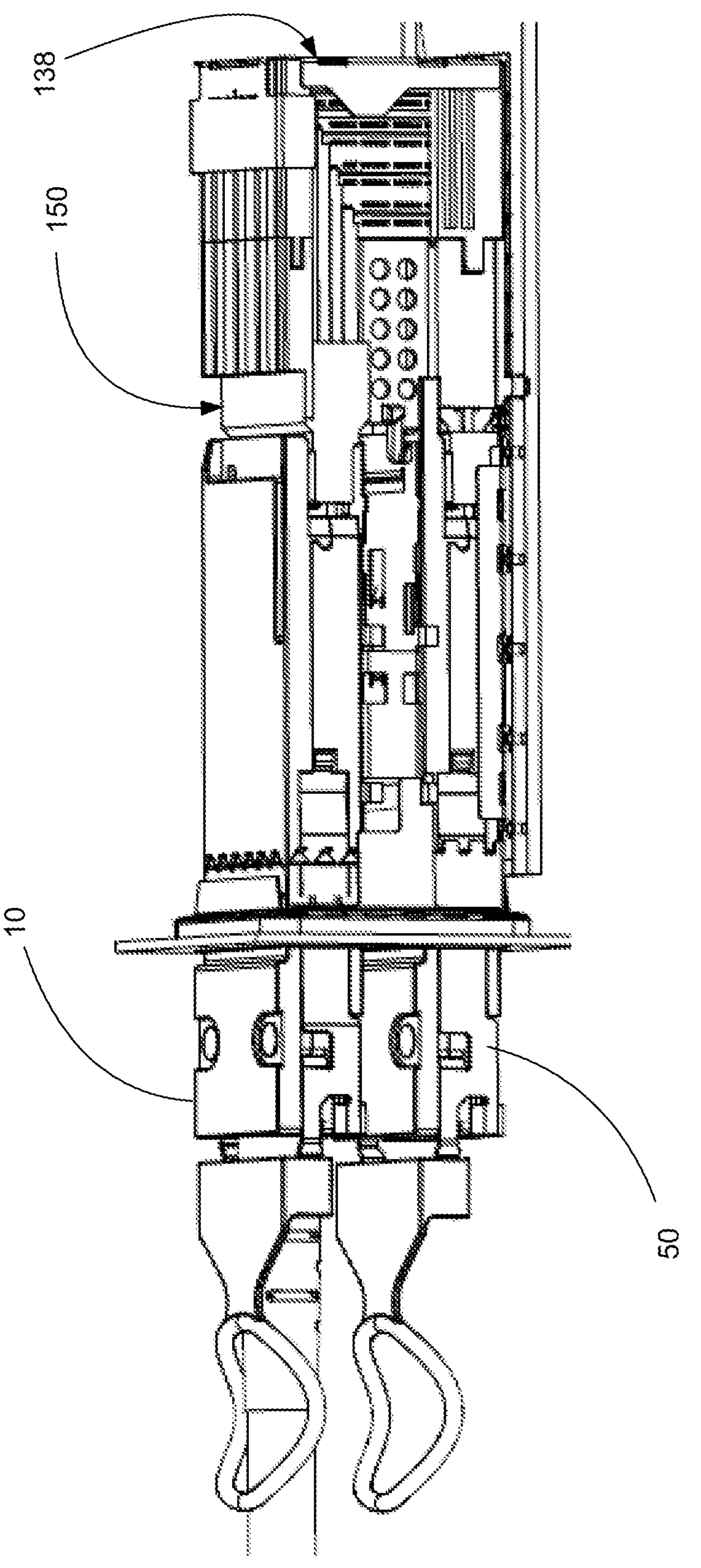
FIG. 10 illustrates a perspective view of an embodiment with two plug assemblies inserted into a receptacle assembly, the cage being partially removed.
Figure 11:
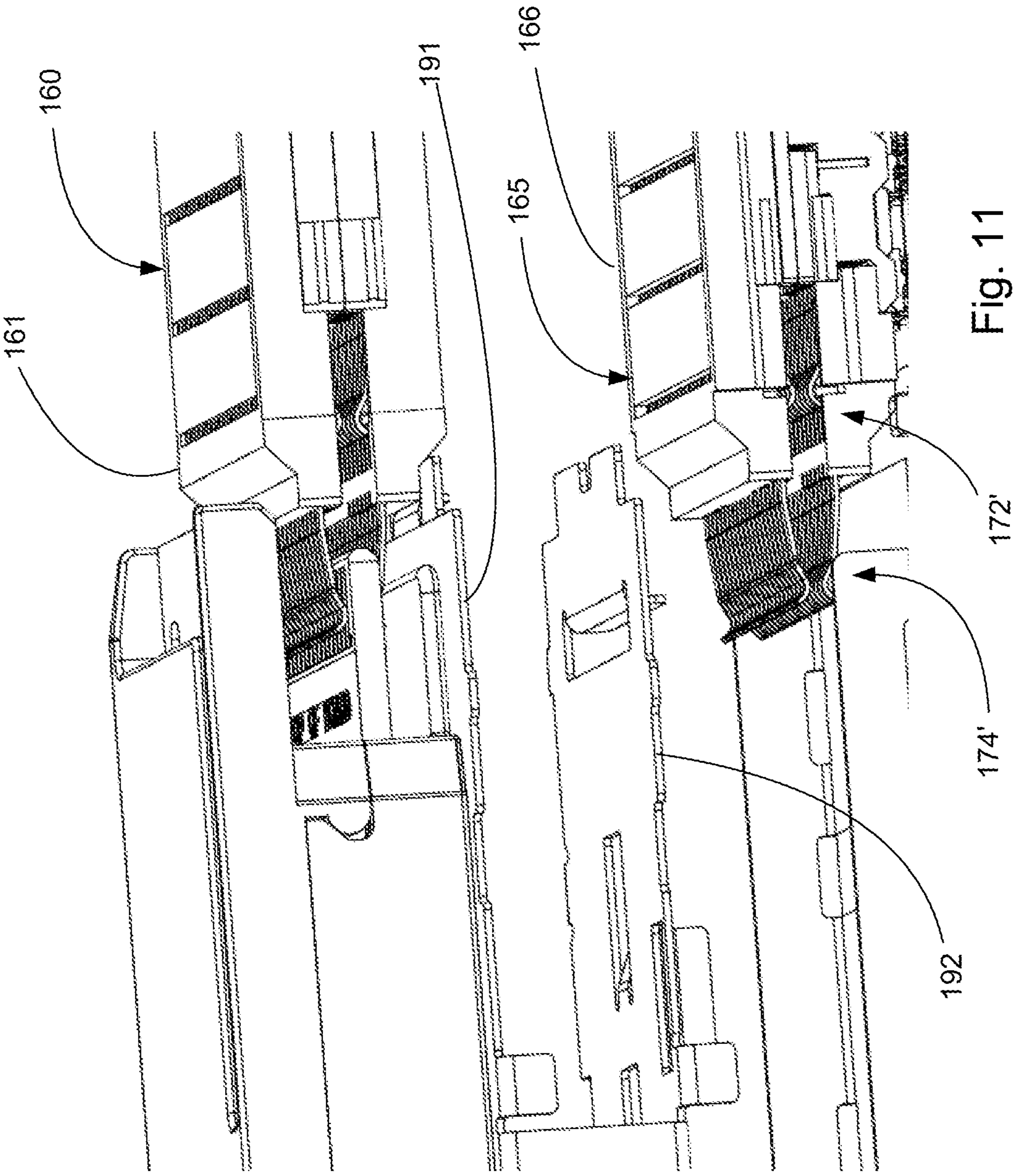
FIG. 11 illustrates a simplified perspective view of terminal rows connected to a conventional plug assembly.
Figure 12:
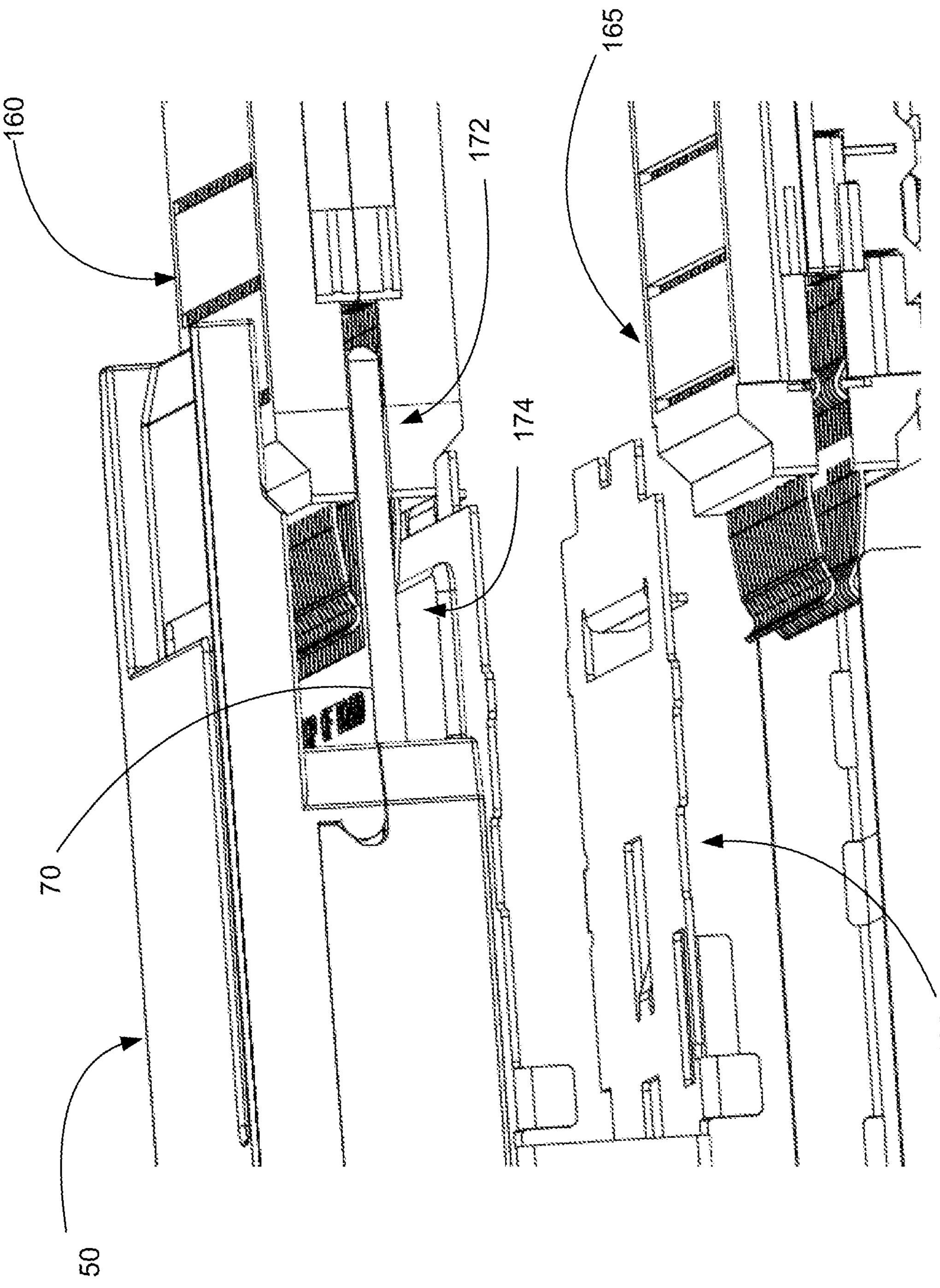
FIG. 12 illustrates a perspective view of the embodiment depicted in FIG. 11 but with an enhanced plug assembly connected to both connection regions.
Figure 13:
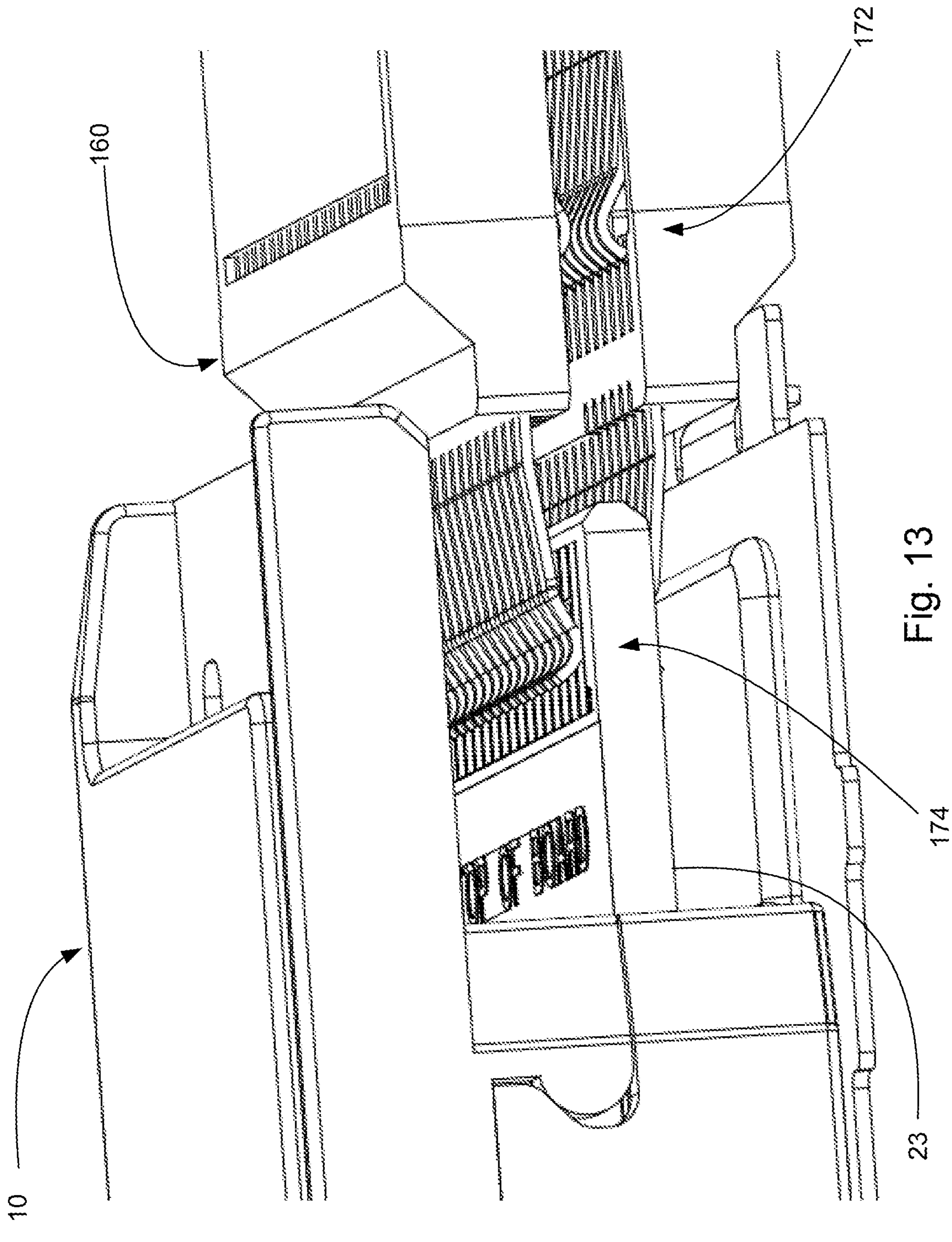
FIG. 13 illustrates an enlarged perspective view of the embodiment depicted in FIG. 11.
Figure 14:
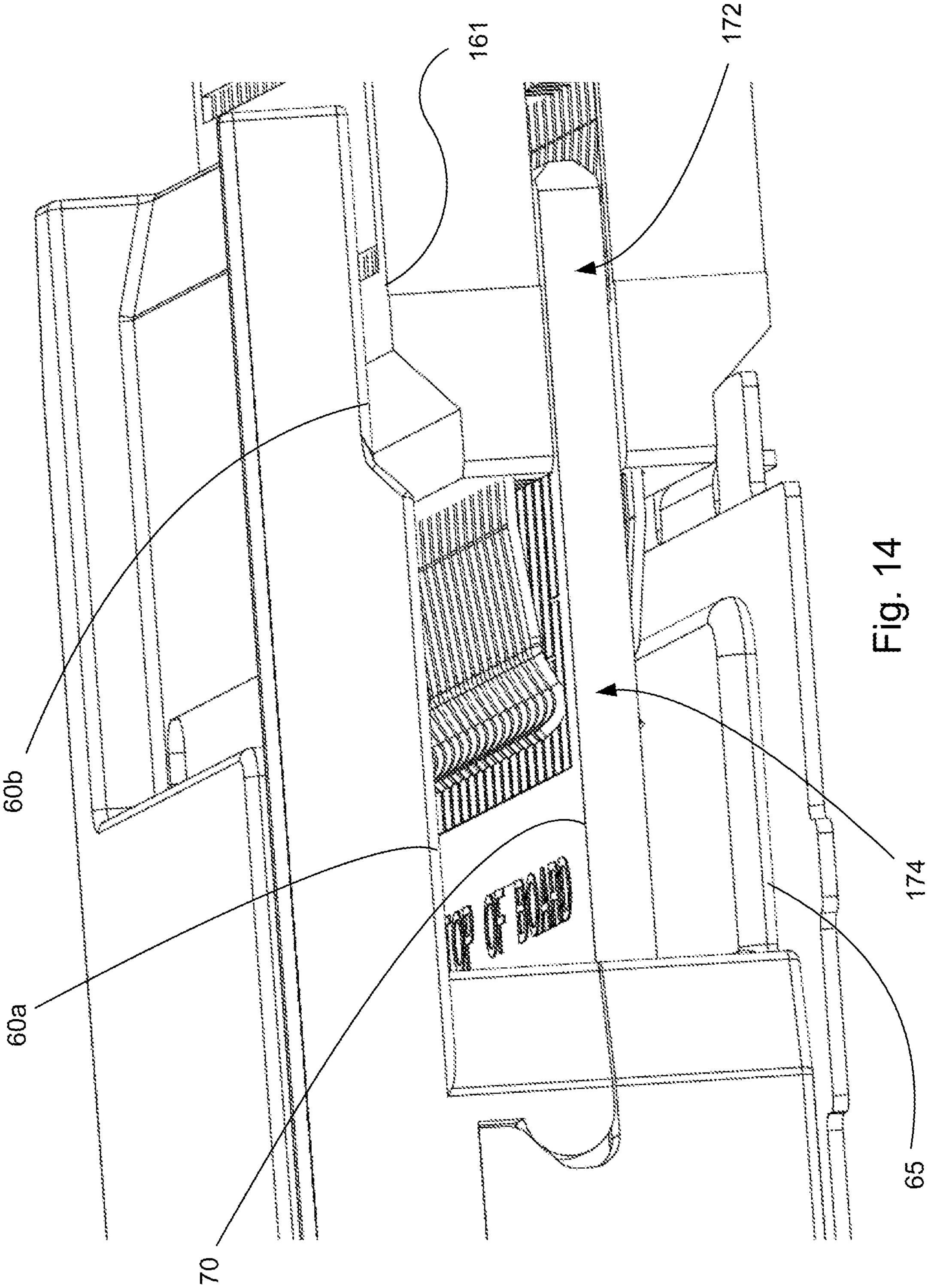
FIG. 14 illustrates an enlarged perspective view of the embodiment depicted in FIG. 12.
Figure 15:
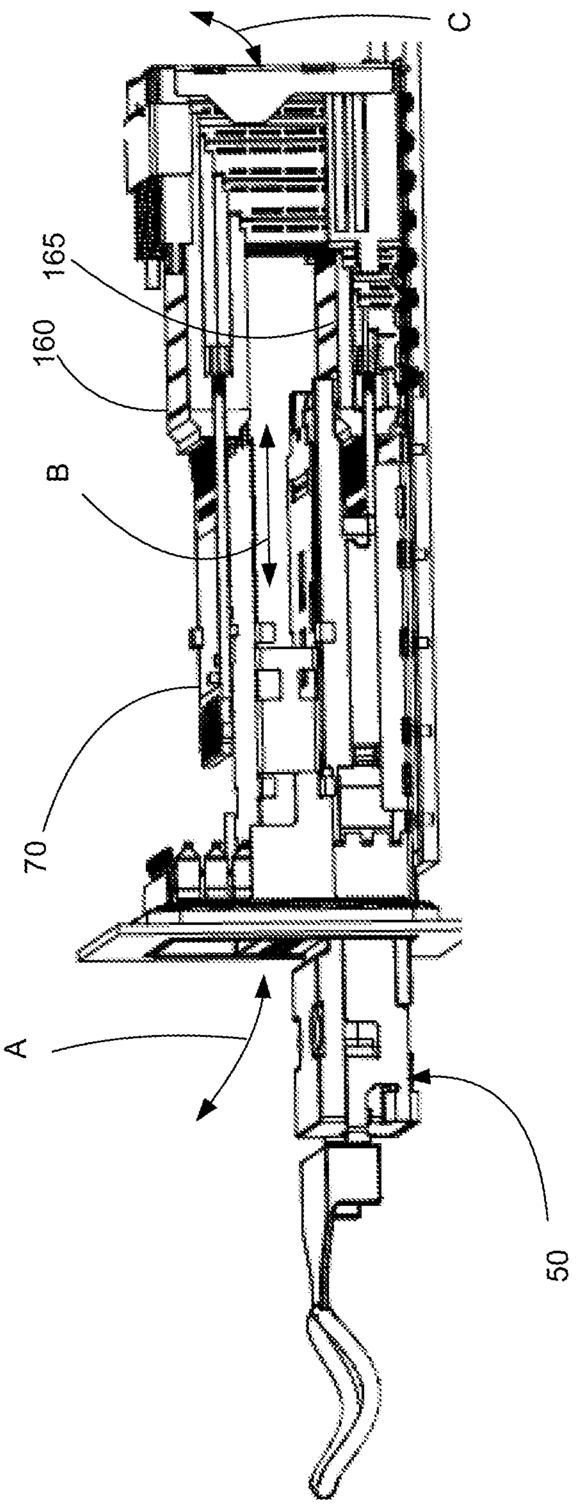
FIG. 15 illustrates a simplified perspective view of two plug assemblies mated in the first and second port with the top plug assembly only having the mating blade shown.
Figure 16:
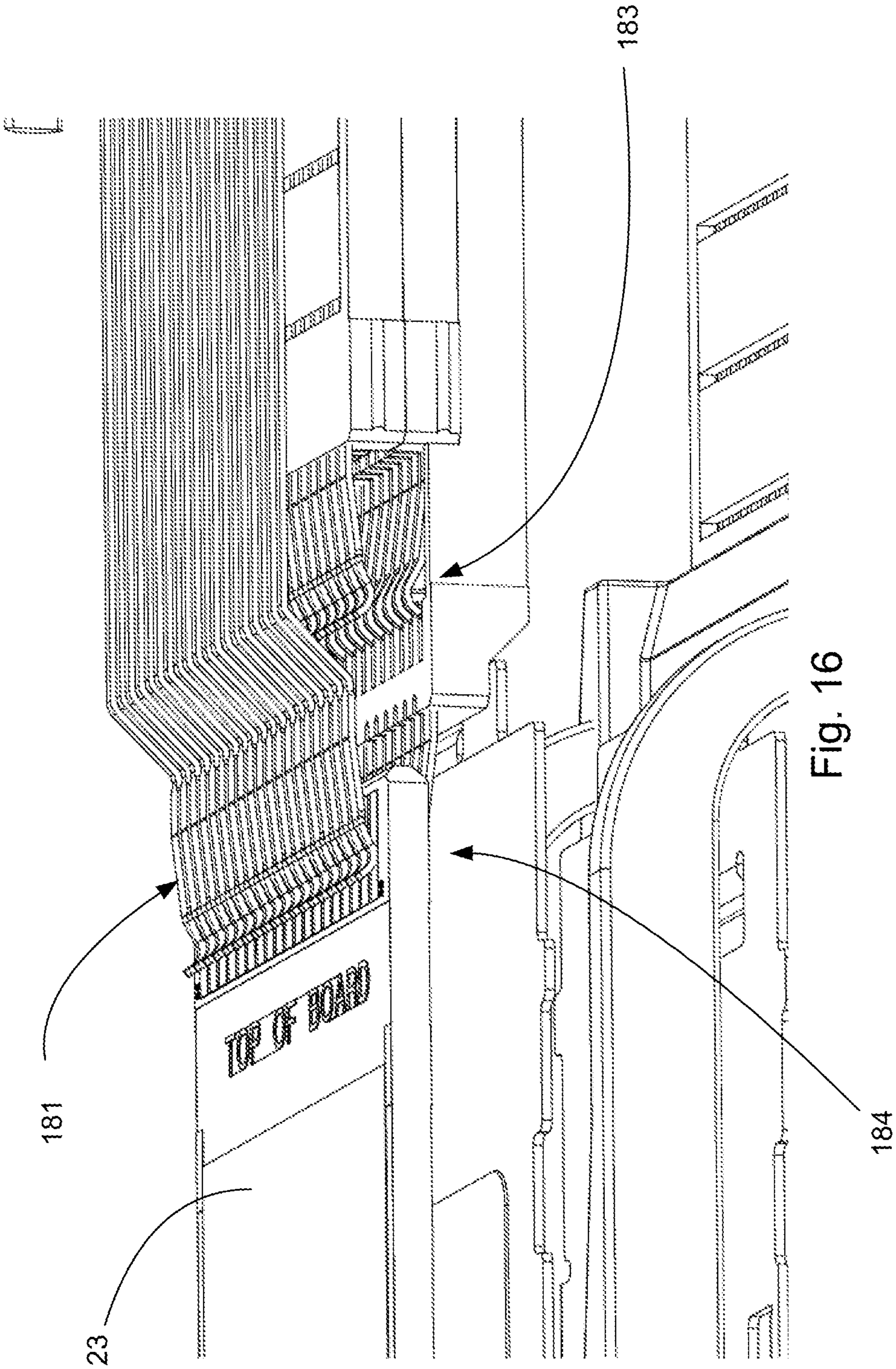
FIG. 16 illustrates an enlarged further simplified perspective view of the embodiment depicted in FIG. 15.
Figure 17:
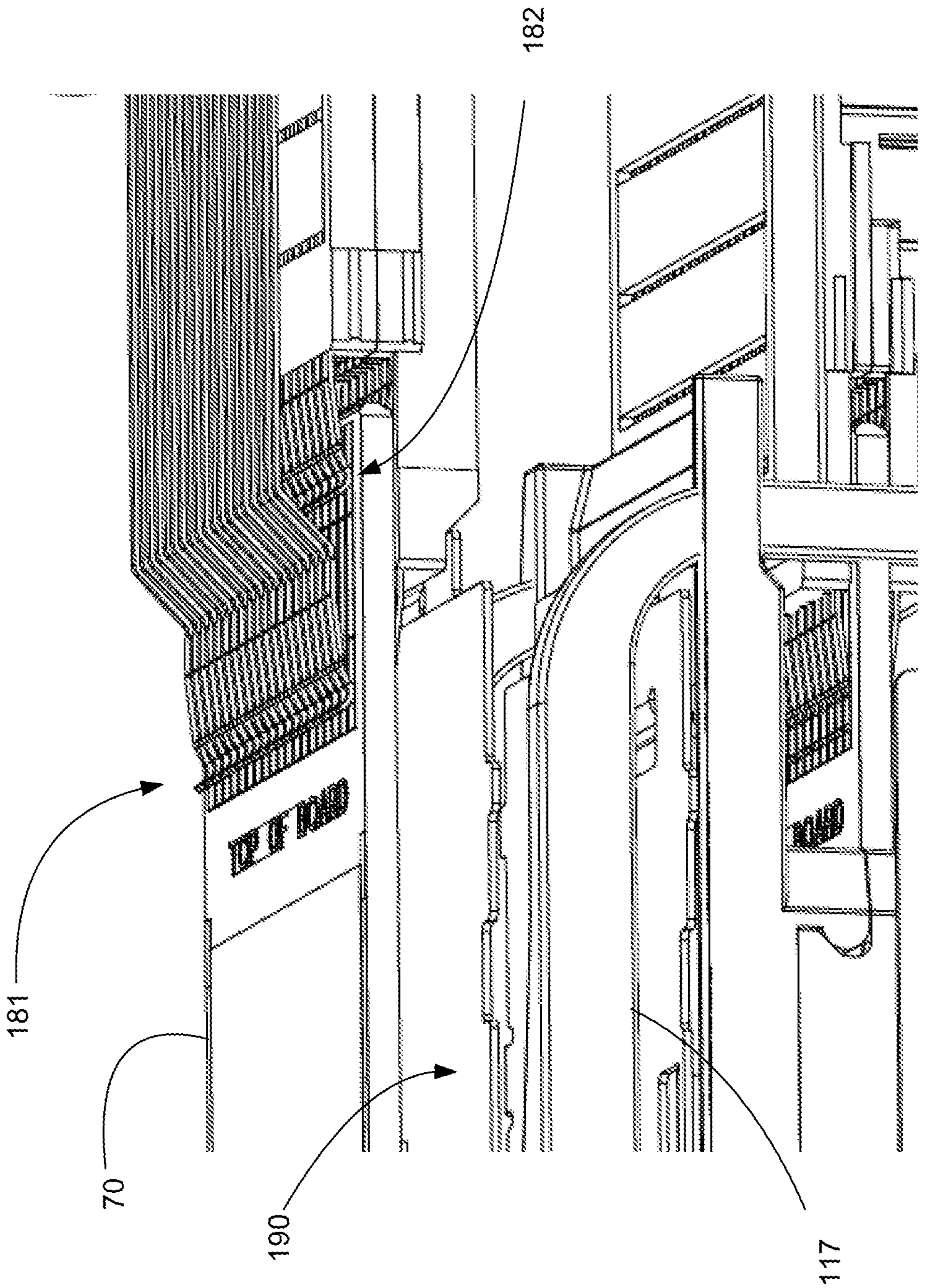
FIG. 17 illustrates a simplified perspective view of another embodiment of two plug assemblies, one simplified, mated to the connector.
Figure 18:
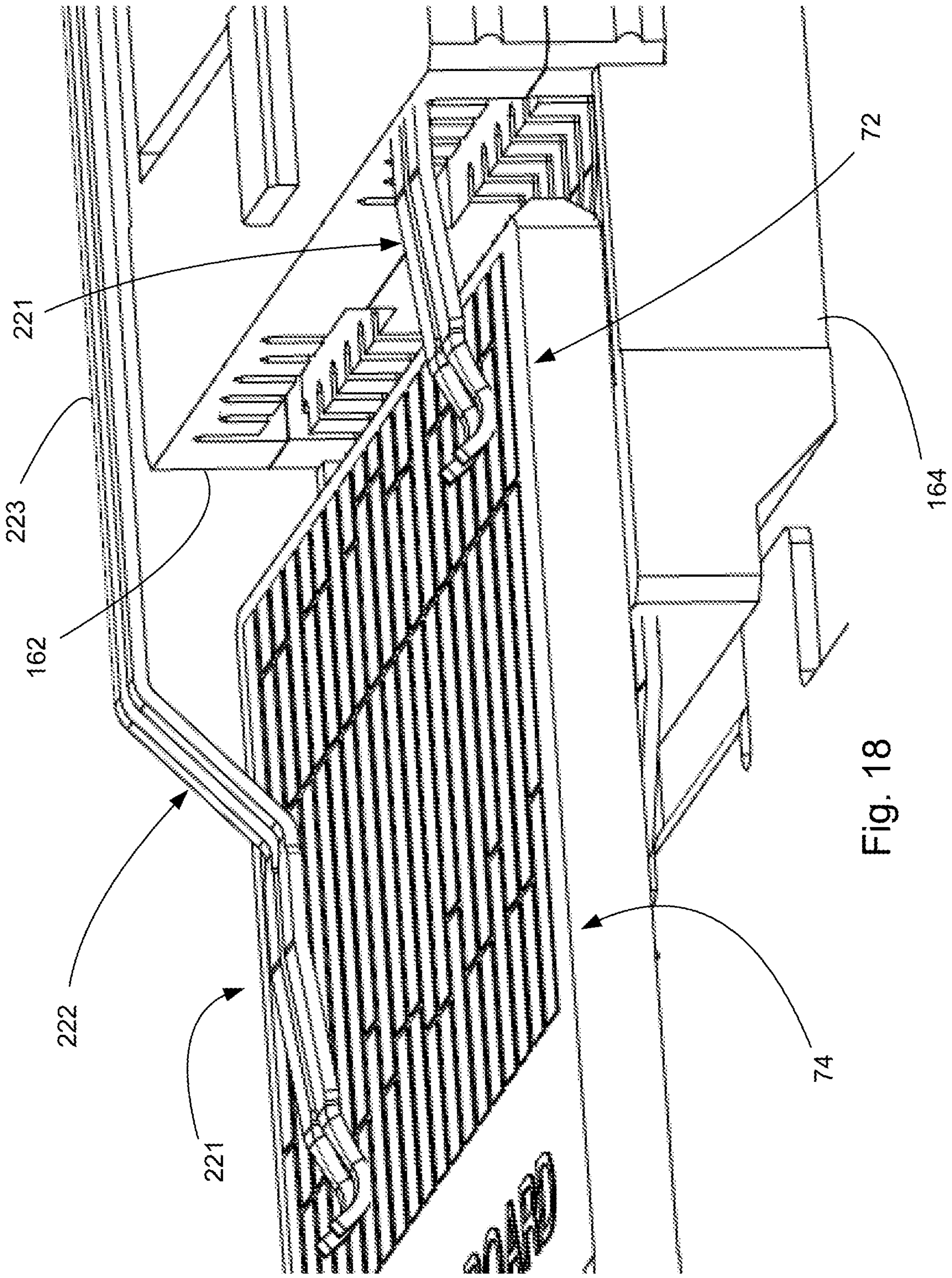
FIG. 18 illustrates a simplified perspective view of two terminals in two separate rows engaging pads on two pad rows.

As can be appreciated from FIGS. 8-42, a receptacle assembly 100 can be mounted on a circuit board 105 if desired and includes a top port 110 and a bottom port 115. The receptacle assembly 100 includes a connector 150 positioned in a cage 120 and the cage 120 helps define the ports 110, 115 and can be configured to be mounted to a bezel 103. In operation a plug assembly is inserted into the port in an I direction. The connector include a mating face 150*a* and a mount face 150*b*. The cage 120 includes a front face 116, a top wall 131, a plurality of side walls 135, a bottom wall 132 and a rear wall 138. The side walls 135 can include side vents 136 and the rear wall 138 can include rear vents 139 to aid in air flow. Thus the cage 120 can include vents to allow for air to flow through the cage 120. The cage 120 can include retention members 122 that are configured to engage the latching system 57 so as to allow a plug assembly to be releasably mated to the receptacle assembly. As can be appreciated from FIG. 10, the depicted receptacle assembly can accept a plug assembly 10 or a plug assembly 50, the plug assembly 50 including two rows of pads or contacts, in either the top or the bottom port.

In order to define the two ports more fully, a divider 190 is positioned between the top port 110 and the bottom port 115. The divider 190 includes a first wall 191 and a second wall 192. The first wall 191 that helps define the top port 110 and the second wall 192 helps define the bottom port 115. The divider 190 also provides a channel for air to flow between the ports in direction B-B so that air can flow pass through front vents 107 in center wall 106 (path A-A) or through rear vents (path C-C), through path B-B and then through path C-C or AA. If the vents 136 are provided then another path of air through the vents is also possible. More will be said about the air flow below.

The connector 150 includes a first module 160 and a second module 165 that respectively provide the mating contacts positioned in the top and bottom ports 110, 115. It should be noted that each of the modules 160, 165 are depicted as being different because in some embodiments it will be desirable to connect terminals 230 (or some of the terminals 230) to the supporting circuit board. Thus, as depicted the first module 160 includes a first terminal row 181 supported by a frame 181*a*, a second terminal row 182 supported by a frame 182*a*, a third terminal row 183 supported by a frame 183*a* and a fourth terminal row 184 supported by a frame 184*a*. In a similar fashion, the second module 165 provides a first terminal row 186 supported by frame 186*a*, a second terminal row 187 supported by a frame 187*a*, a third terminal row 188 supported by a frame 188*a* and a fourth terminal row 189 supported by a frame 189*a*. Each of the frames can include cutouts 198 to modify the impedance of the terminal.

Figure 42:
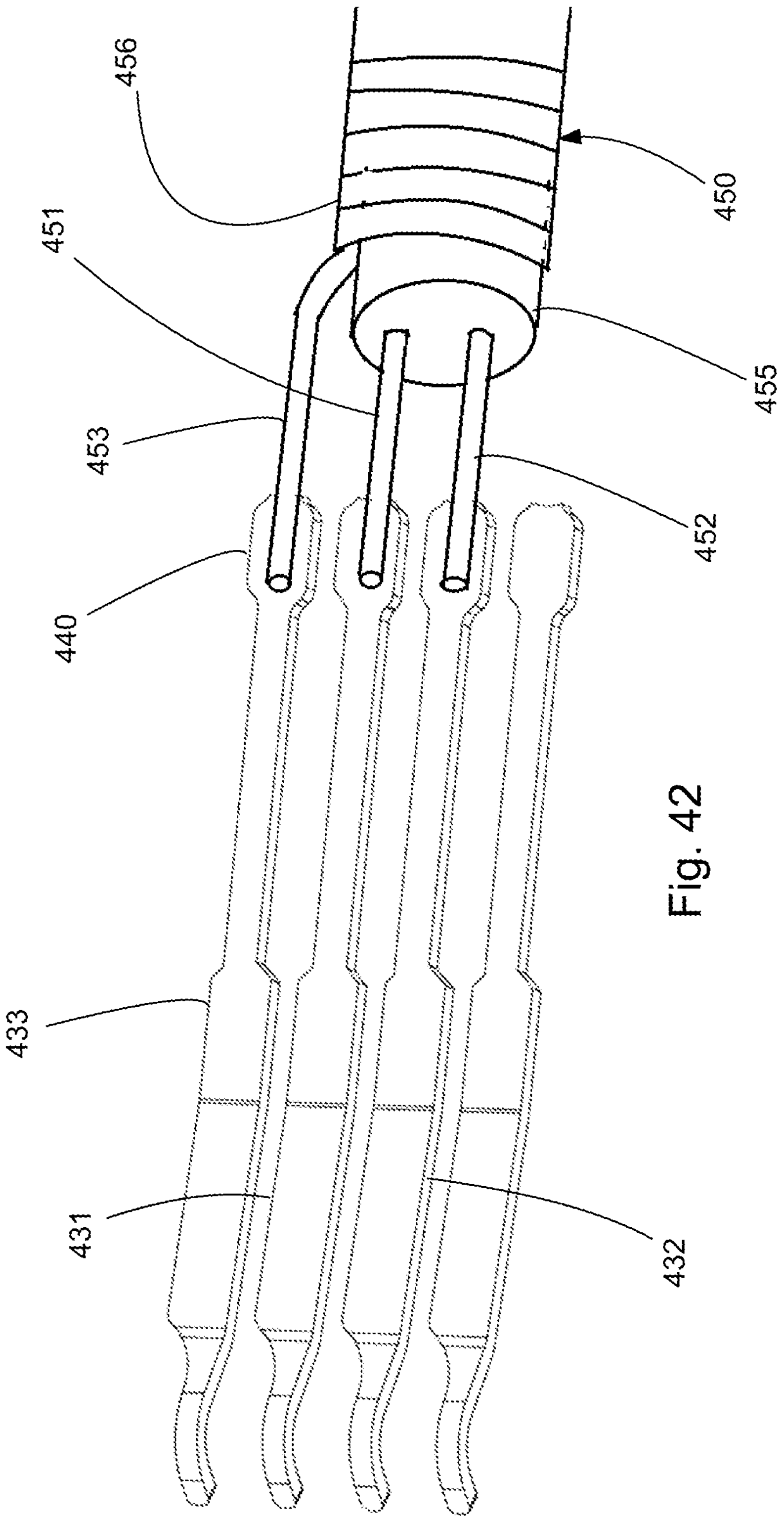
FIG. 42 illustrates a perspective partial view of an embodiment of a terminal row connected to conductors in a cable.

The depicted terminals 230 have different lengths but generally have a contact 231, a cantilevered portion 231*a*, a wide body portion 232*a*, a narrow body portion 232*b* and a tail 233. The depicted tail 233 is configured to be pressed on a mating terminal as will be discussed below but could also be configured to be attached to a conductor of a cable assembly. For example, as shown in FIG. 42, a terminal 431 and a terminal 432 could be arranged as a differential pair and a ground terminal 433 could be positioned beside the differential pair. A cable 450, which could include a shield layer 456, would have an insulation layer 455 supporting two conductors 451, 452 that would be attached to terminals 431, 432 (respectively) and a drain wire 453 could be attach to ground terminal 433. The attachments between the terminals and the conductors could be as desired (including but not limited to solder or welding) and would allow the terminals to be connected to wires without the need to enter the circuit board. Thus, the configuration of the tail is not limited and the depicted connector 150 configuration is not intended to be limiting unless otherwise noted. As can be further appreciated, if the module was configured with cable attachment such as is depicted in FIG. 42 then the same module could be used repeatedly and it would also become optional as to whether the cage was mounted on a circuit board.

Each module 160, 165 provides two connection regions. Specifically, module 160 includes first connection region 172 and second connection region 174 while module 165 includes first connection region 172' and second connection region 174'. The first connection region is provided by contacts in by the first terminal row 181 and in the second terminal row 184 (which provide rows of opposing contacts) while the second connection region is provided by contacts in the second terminal row 182 and the third terminal row 183 (which again provide row of opposing contacts). As can be appreciated, two terminal rows (the depicted terminal rows 186 and 187 in FIG. 41 or terminal rows 181 and 182 if the module 160 was used as an example) are configured to engage a mating surface defined by plane M from a first side while having tails that end on the same first side of plane M. In addition, two other terminal rows will be positioned and extend along a second side of the plane M and in an embodiment none of the terminal rows will cross plane M.

In operation, a plug assembly can be inserted into the top port 110 and a mating blade will engage the second connection region 174. If the plug assembly is a standard design then the mating blade has a single pad row that will only engage the second connection region. If the plug assembly has two pad row design (e.g., a high density design) then the first pad row on the mating blade will first engage the second connection region and then as the plug assembly is fully inserted into the port, the first pad row will slide past the second connection region 174 and engage the first connection region 172. Accordingly, for a plug assembly with two pad rows of signal contacts on each side, the first pad row 72 will engage the first connection region 172 while the second pad row 74 will engage the second connection region 174. If desired the first connection region 172' and second connection region 174' can be similarly configured and can operate similarly. This can be appreciated from FIGS. 16 and 17.

As previously noted, the top flange 60 includes the first lower surface 60*a* and the second lower surface 60*b*. The modules 160, 165 are configured to support a nose portion 320*a*, 320*b* and the nose portions include a first nose surface 323*a* that is configured to be aligned with the first lower surface 60*a* and may include a nose wall 323*b* that provides a transition to a second nose surface 323*c* that is aligned with the second lower surface 60*b*.

Figure 19:
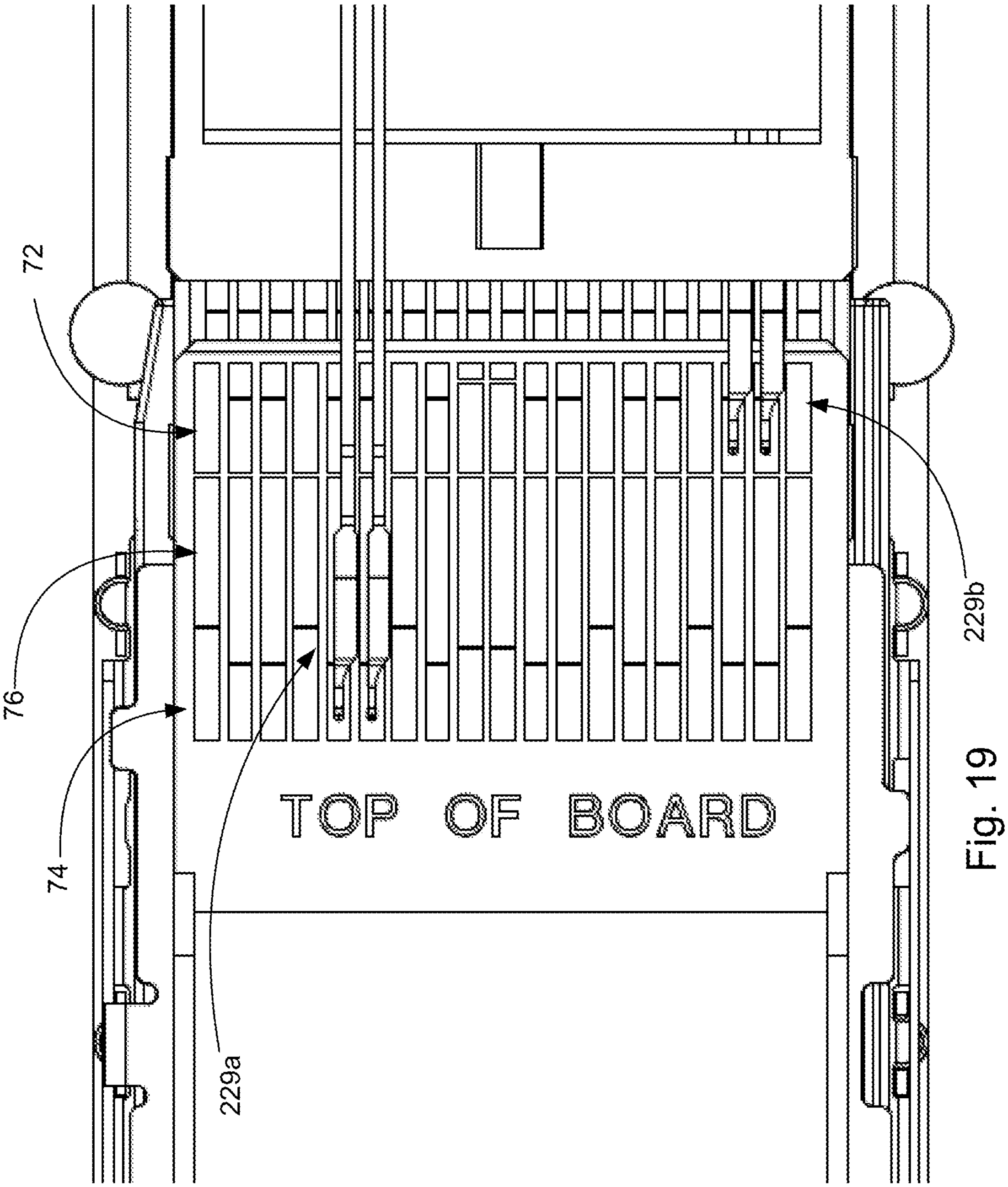
FIG. 19 illustrates a plan view of the embodiment depicted in FIG. 18.
Figure 20:
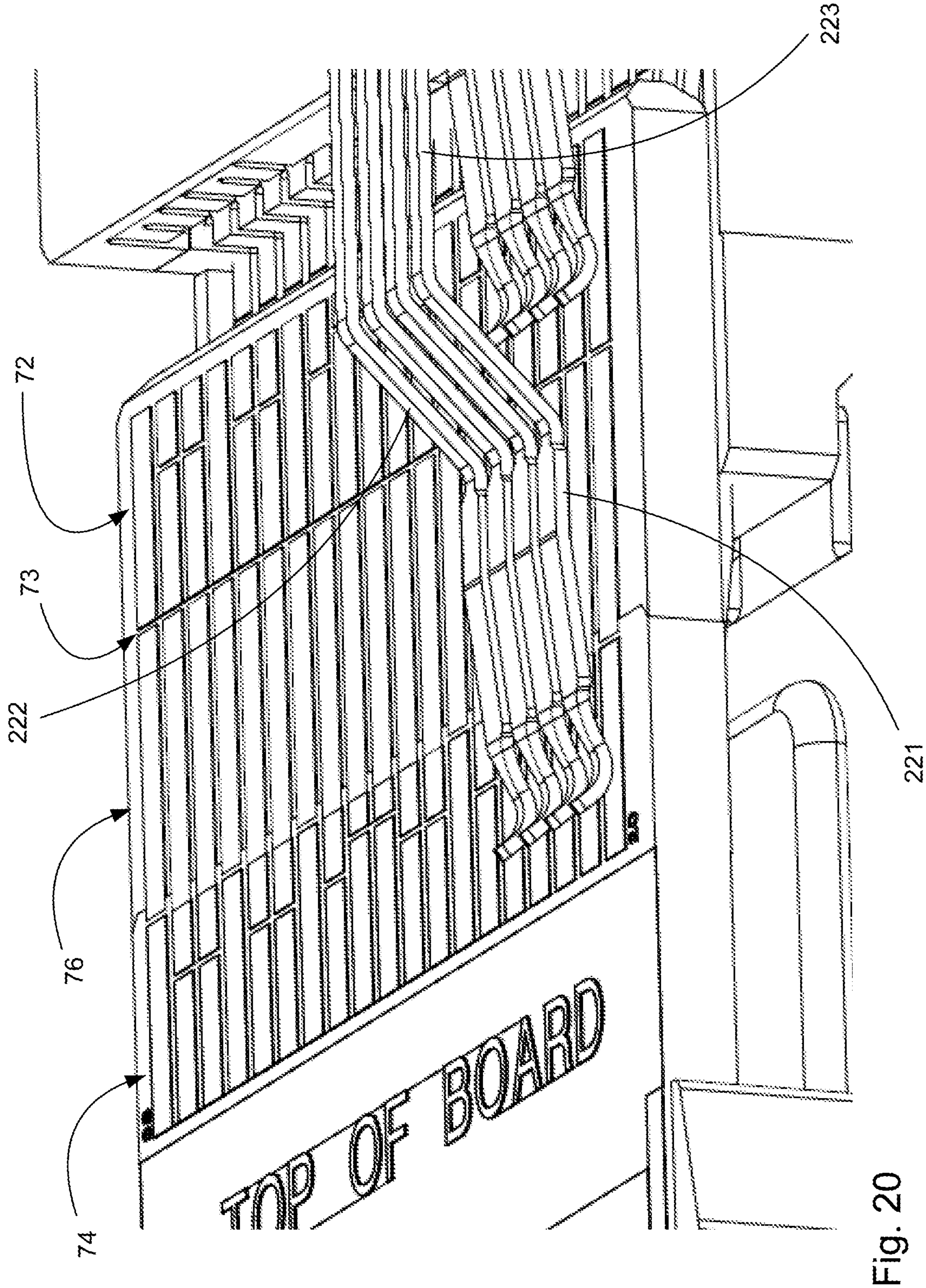
FIG. 20 illustrates a simplified perspective view of two partial terminal rows engaging two pad rows.
Figure 21:
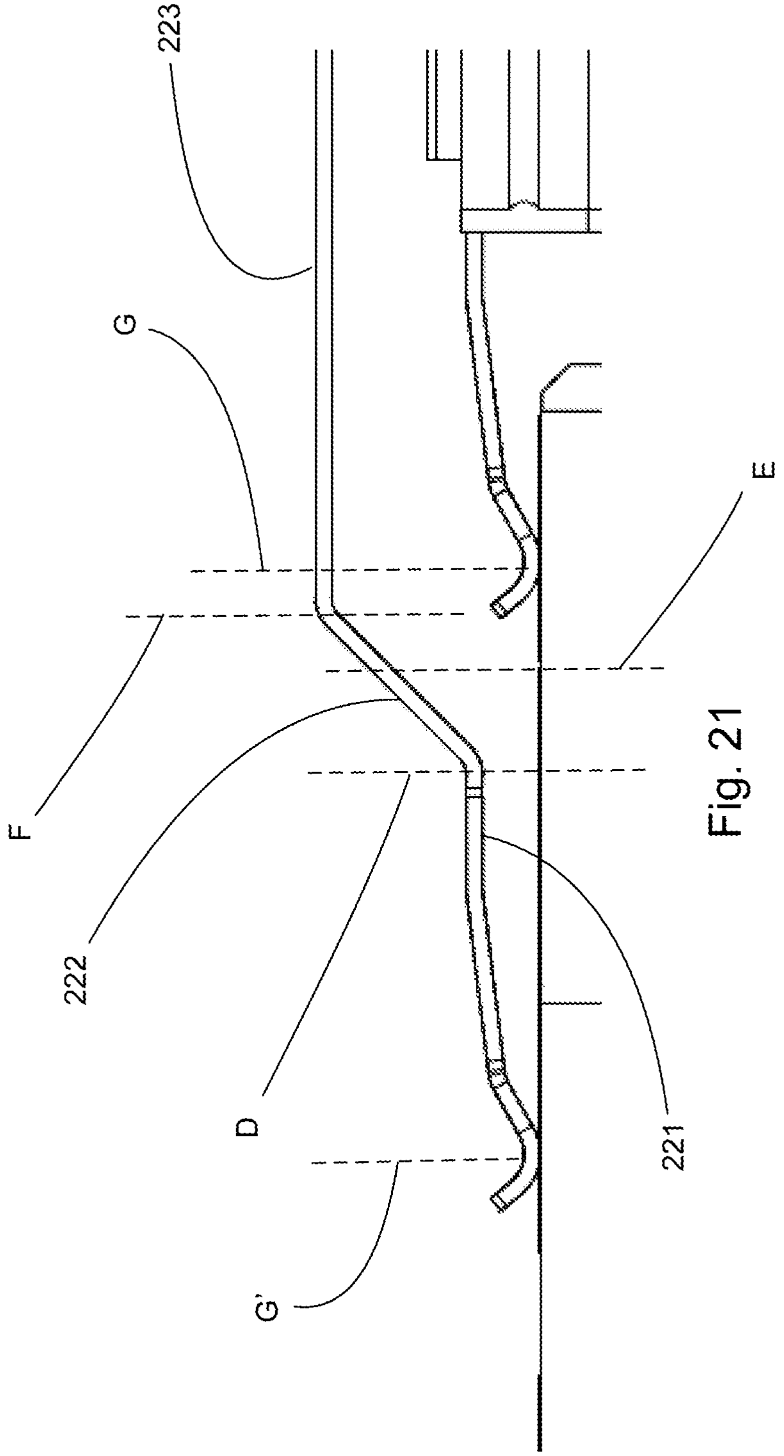
FIG. 21 illustrates an elevated simplified side view of the embodiment depicted in FIG. 20.
Figure 22:
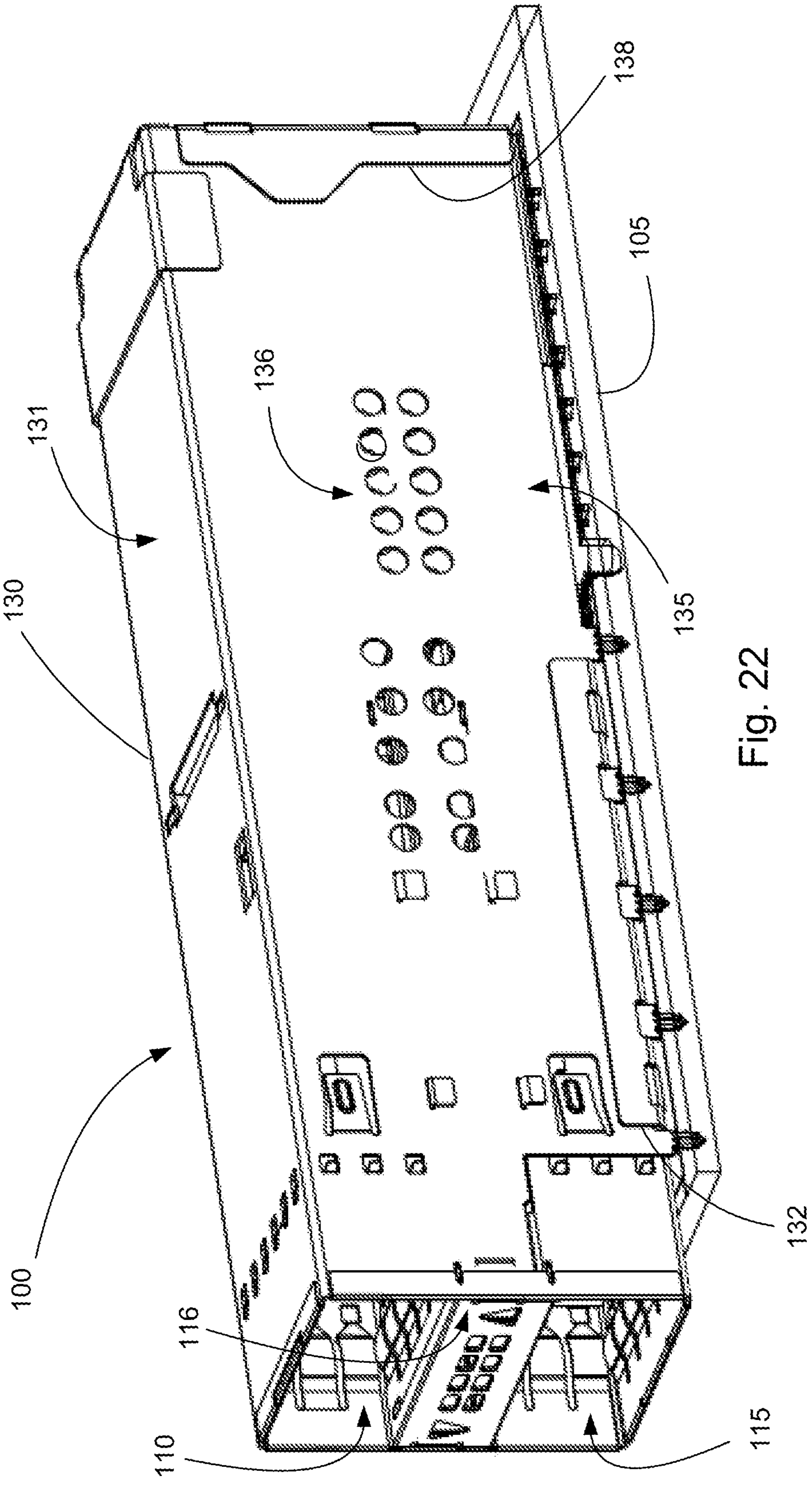
FIG. 22 illustrates a perspective view of an embodiment of a receptacle assembly.
Figure 23:
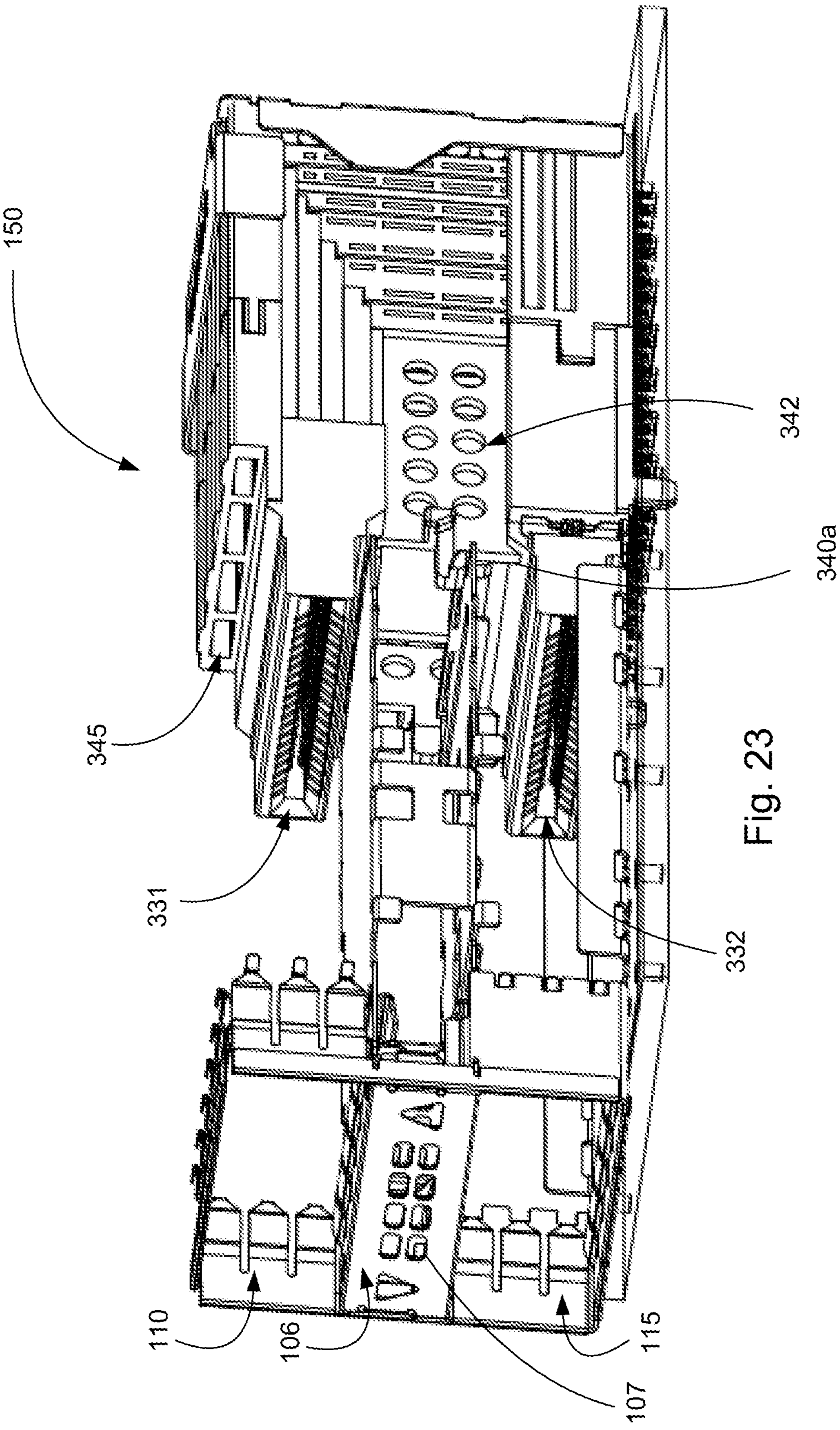
FIG. 23 illustrates a simplified perspective view of the embodiment depicted in FIG. 22.
Figure 24:
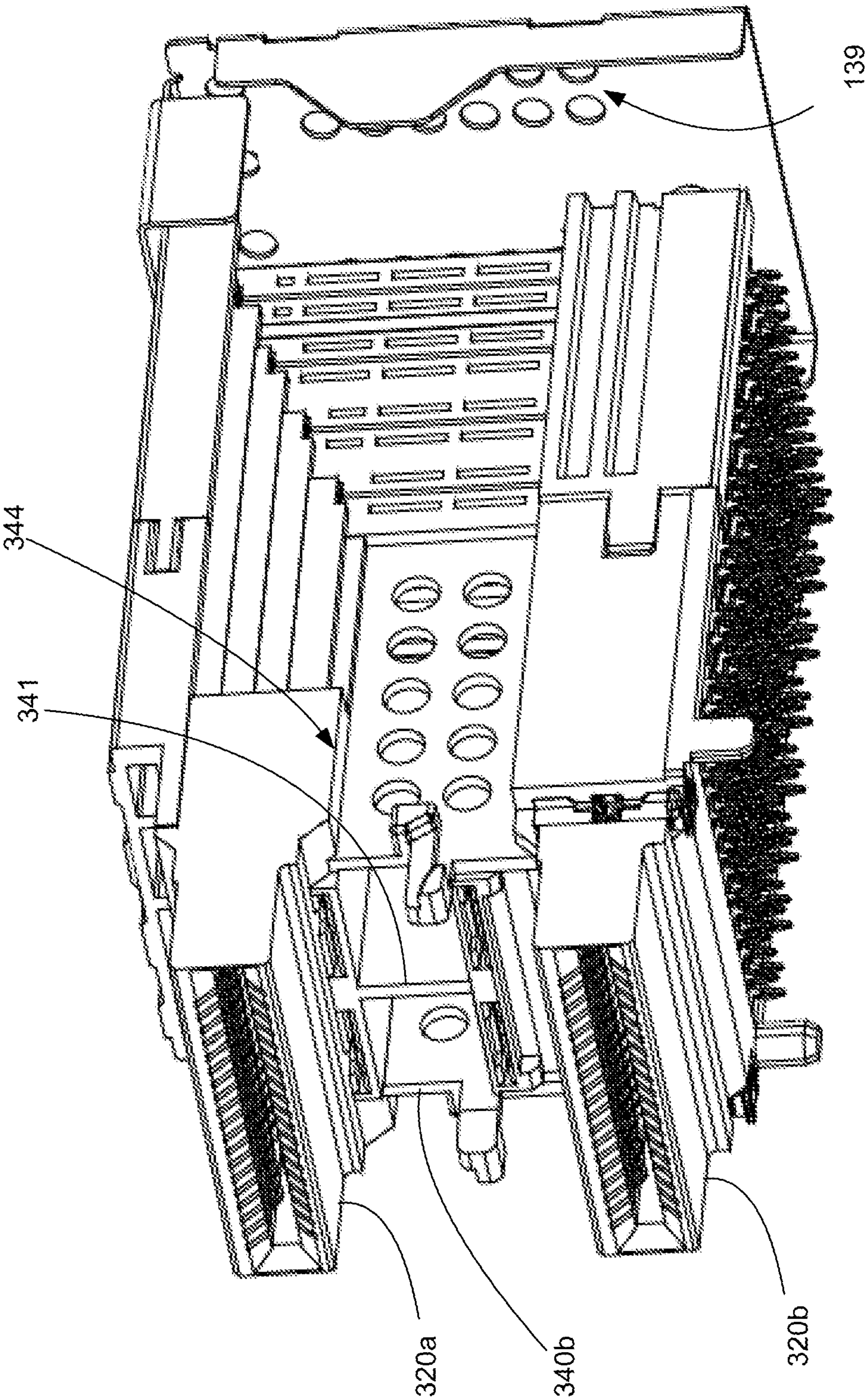
FIG. 24 illustrates a perspective view of an embodiment of a connector.
Figure 25:
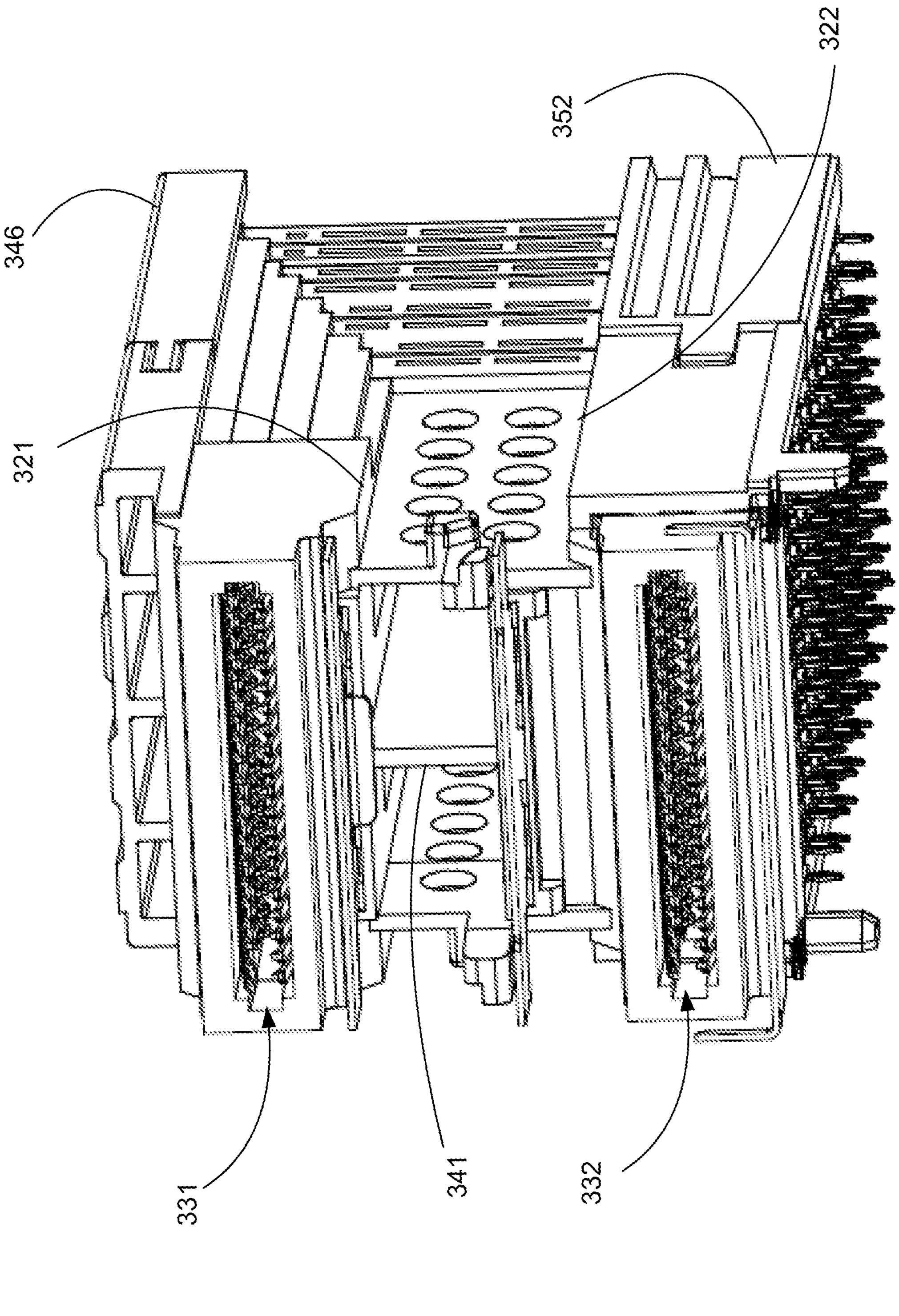
FIG. 25 illustrates another perspective view of the embodiment depicted in FIG. 24.
Figure 26:
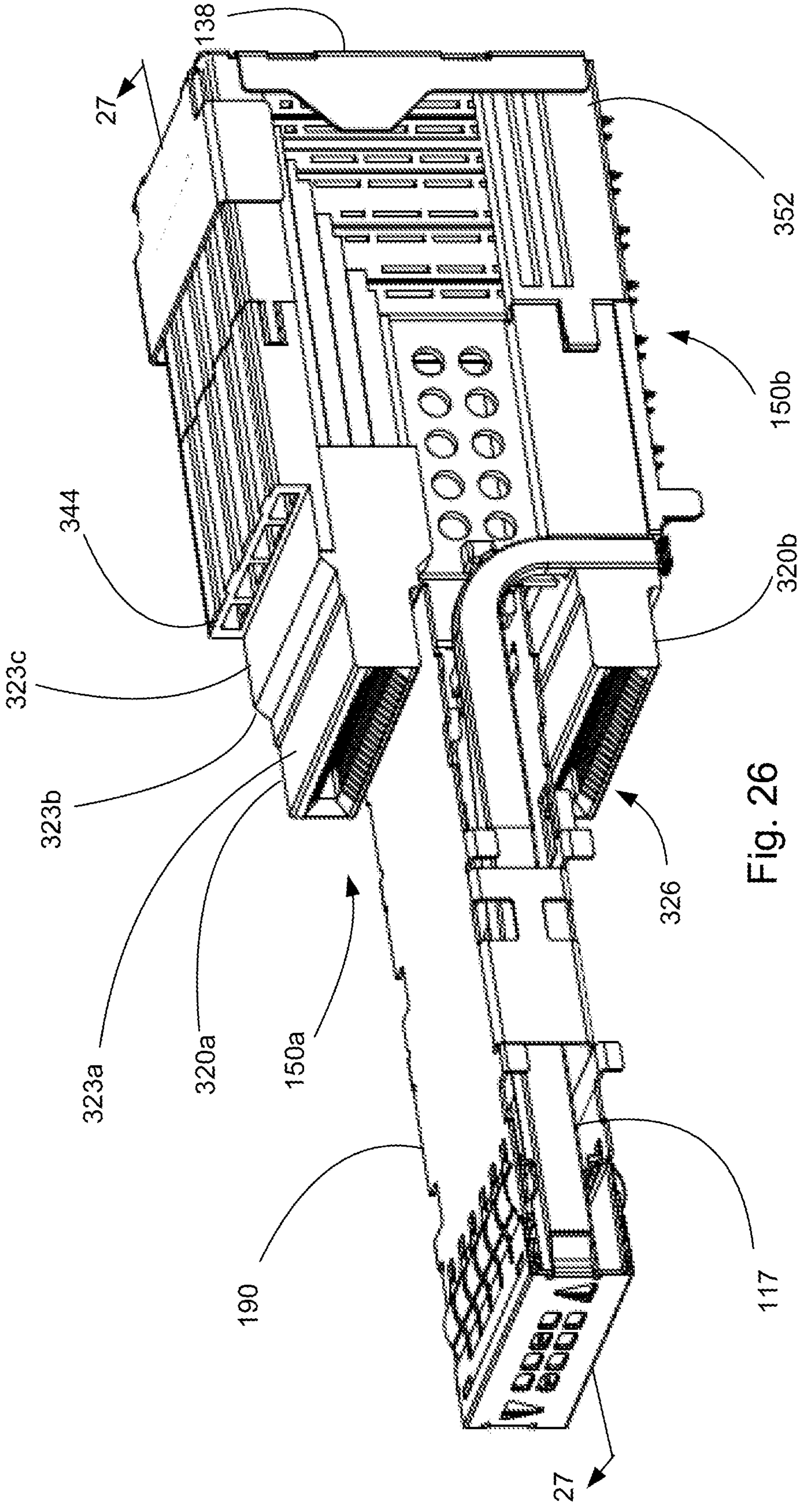
FIG. 26 illustrates a perspective view of connector and a divider.
Figure 27:
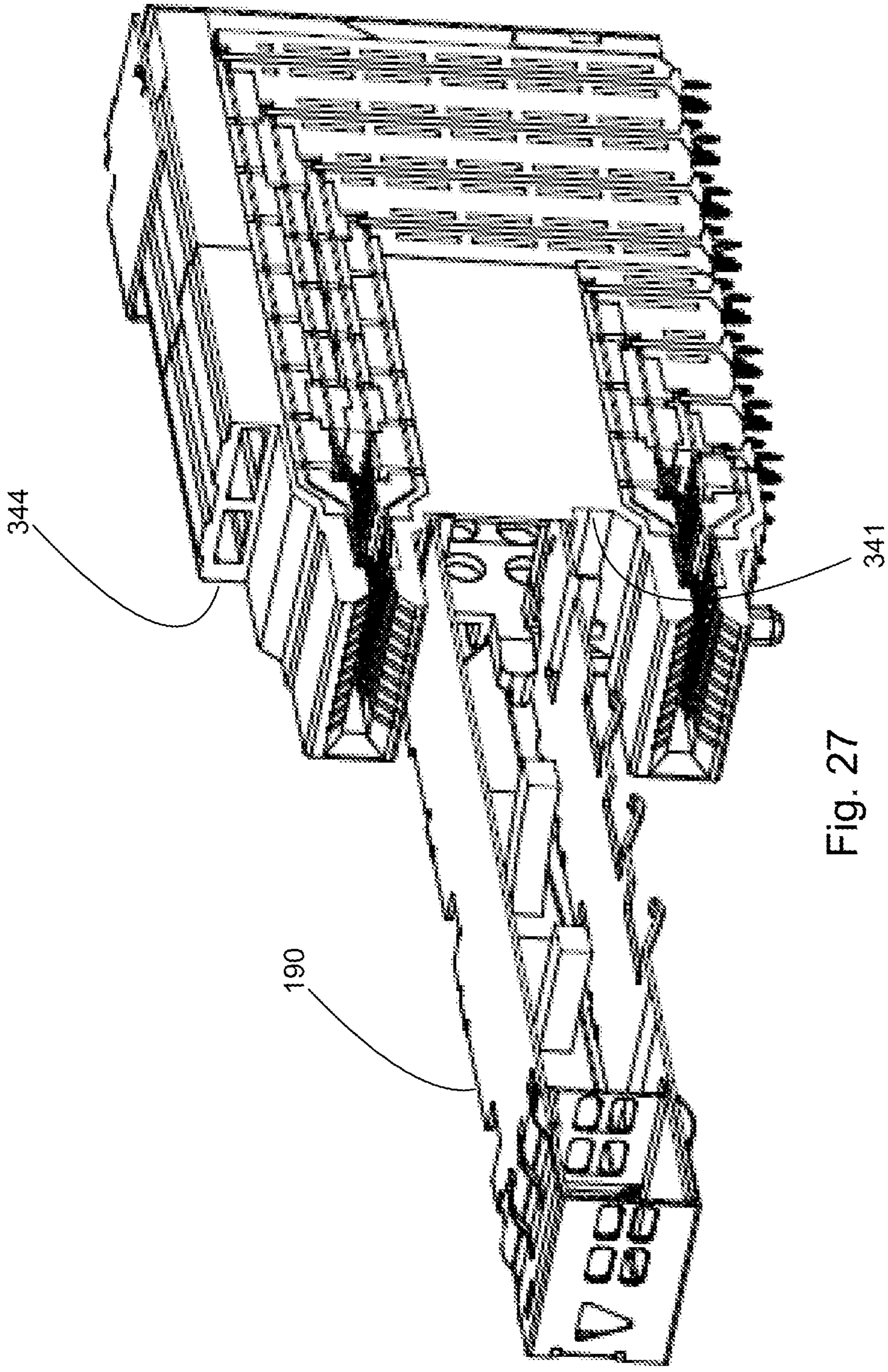
FIG. 27 illustrates a perspective view of a cross-section of the embodiment depicted in FIG. 26, taken along line 27-27.
Figure 28:
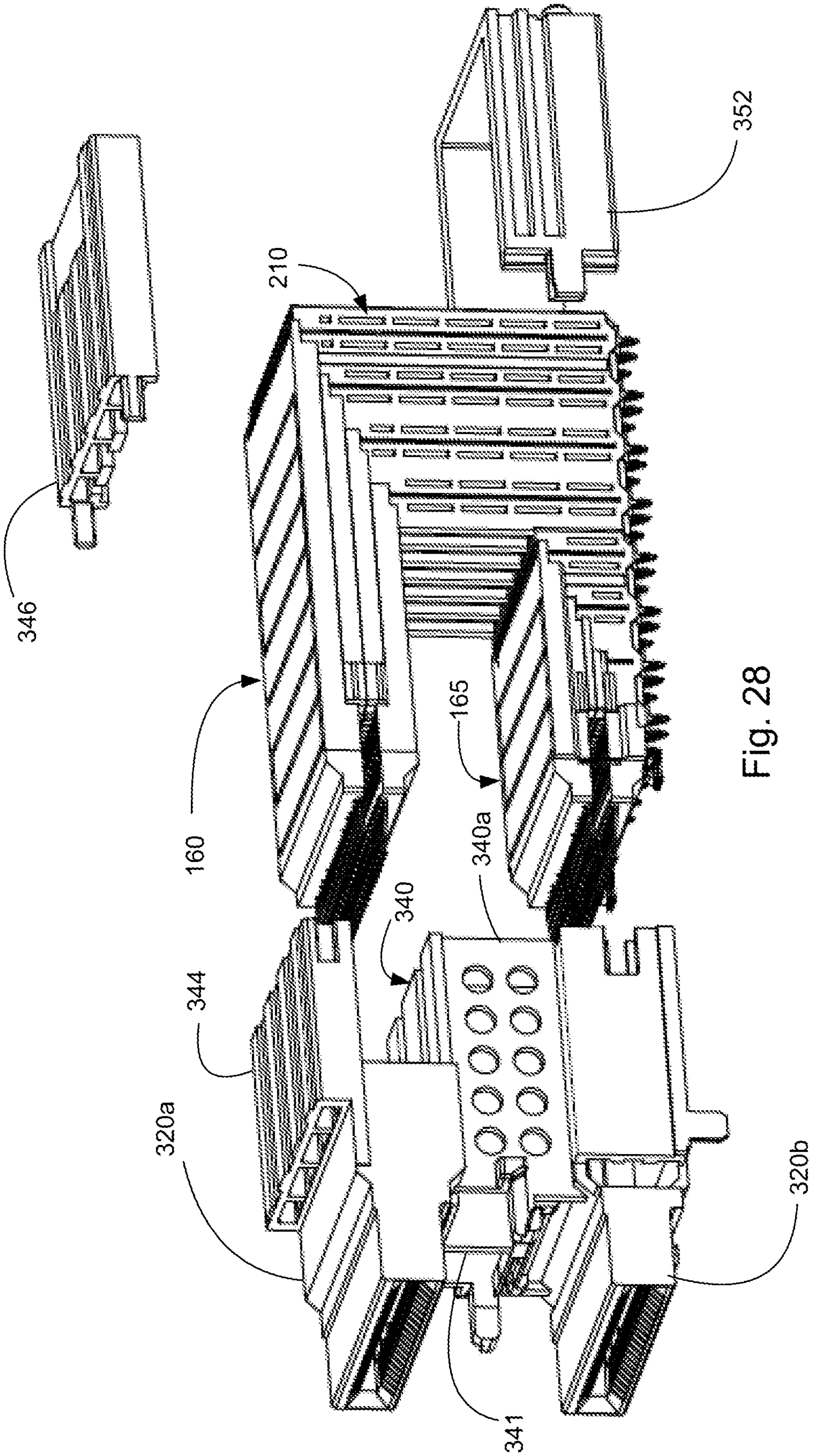
FIG. 28 illustrates a perspective partially exploded view of an embodiment of a connector.
Figure 29:
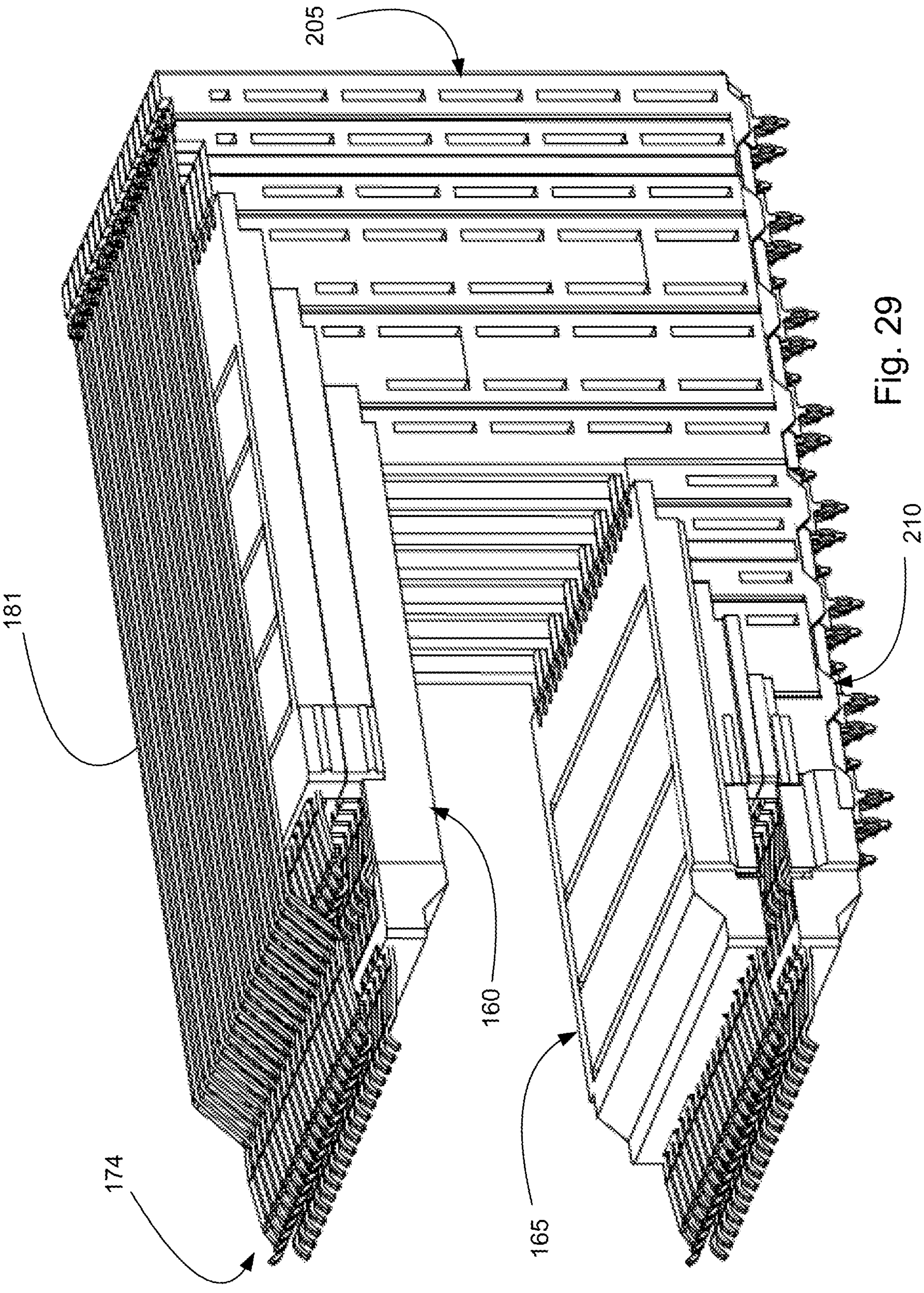
FIG. 29 illustrates a simplified perspective view of an embodiment of a connector.
Figure 30:
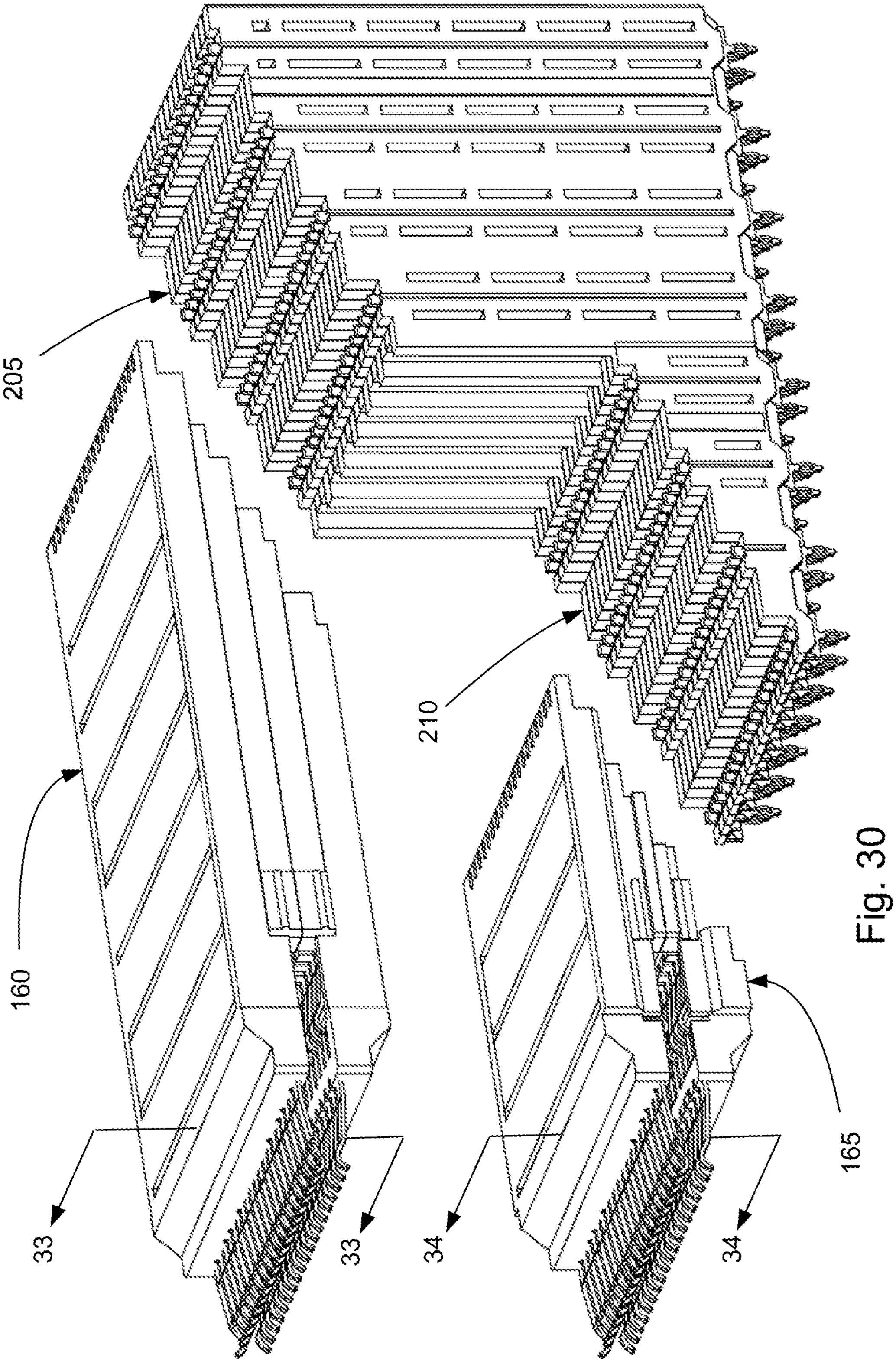
FIG. 30 illustrates an exploded perspective view of two modules and two vertical modules.
Figure 31:
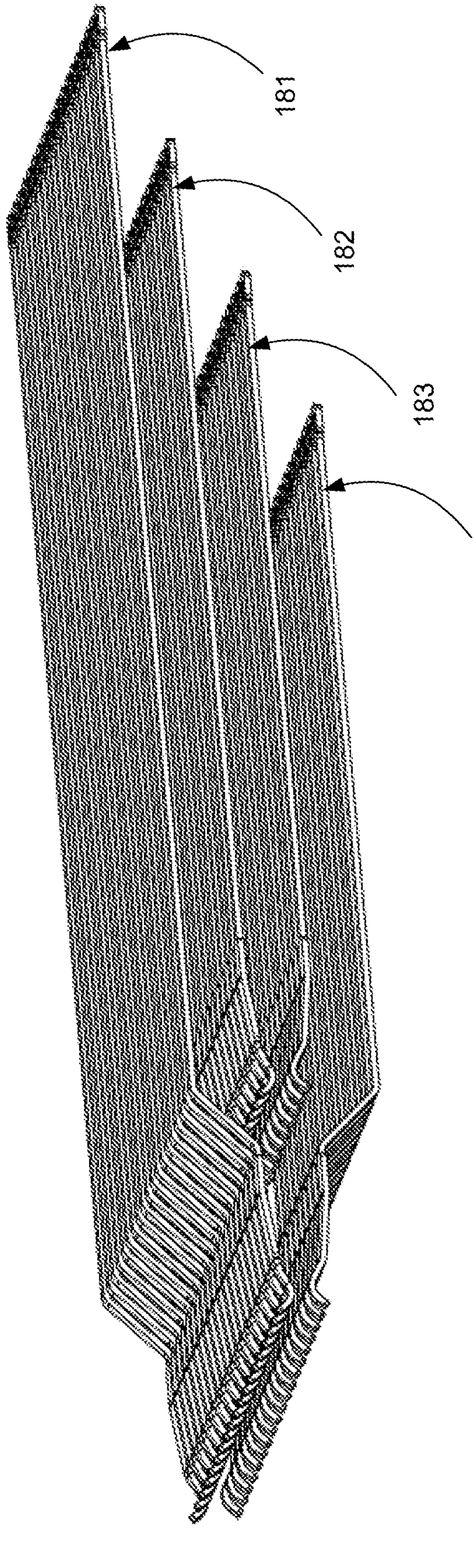
FIG. 31 illustrates a perspective view of a module with the frames removed.
Figure 32:
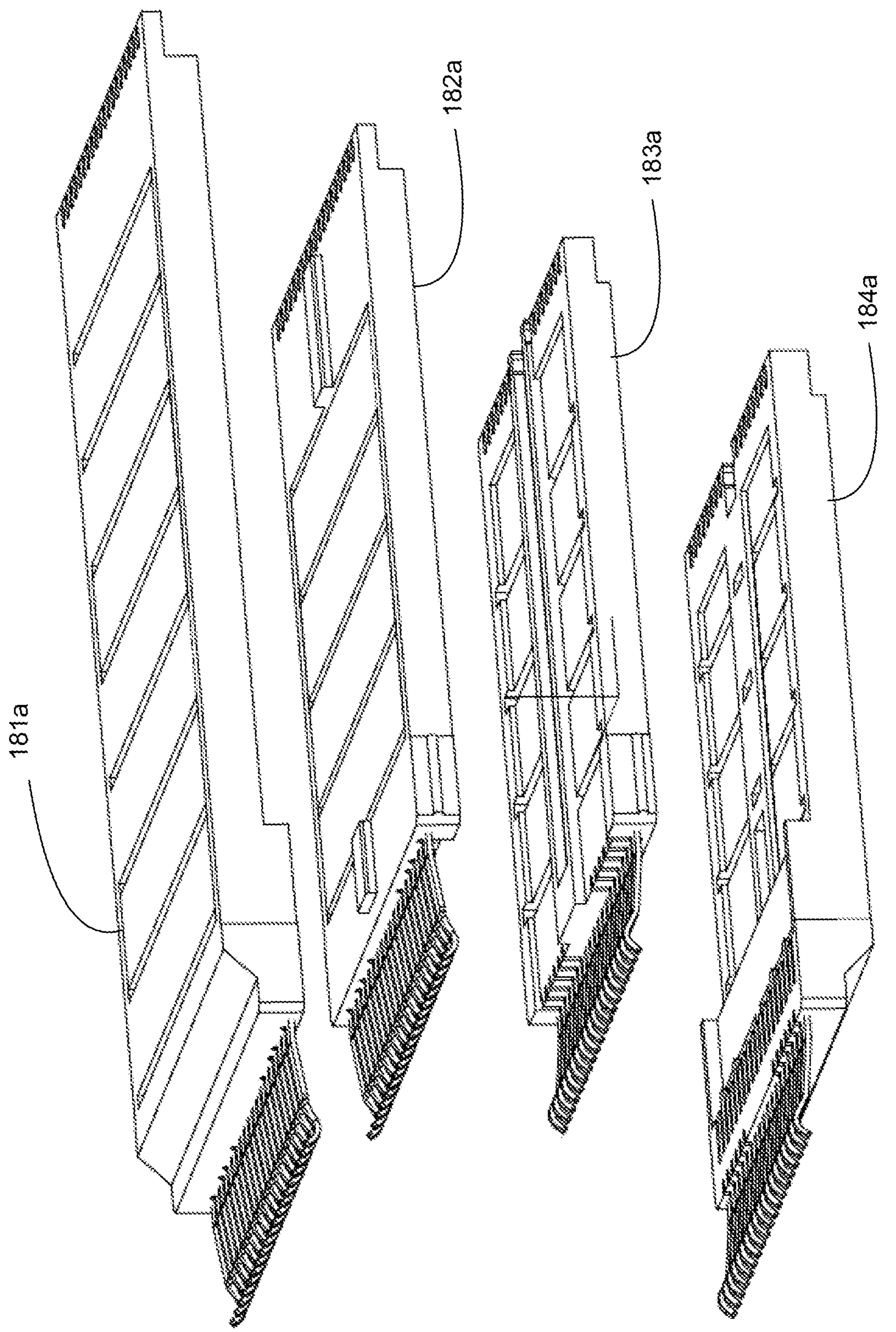
FIG. 32 illustrates an exploded perspective view of an embodiment of a module.
Figure 33:
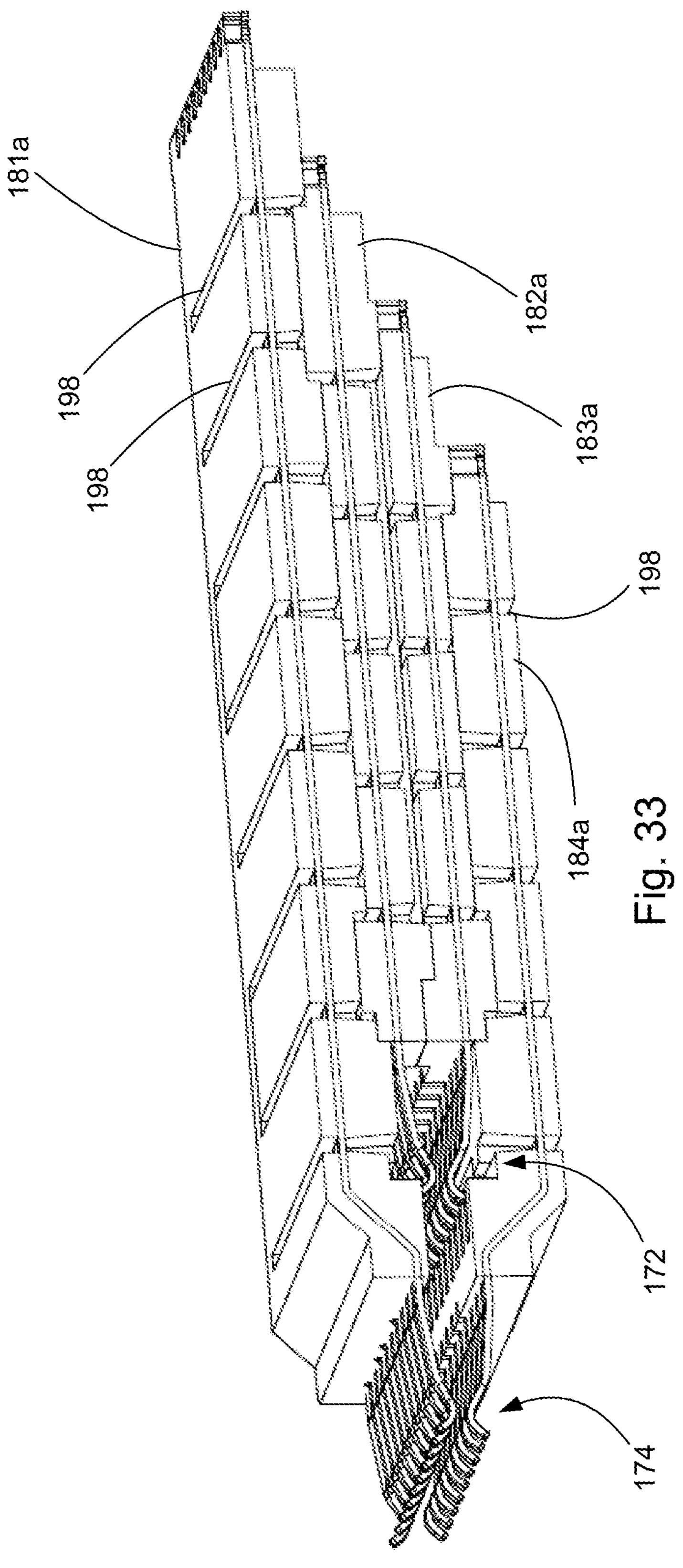
FIG. 33 illustrates a perspective view of a cross section of a module taken along line 33-33 in FIG. 30.
Figure 34:
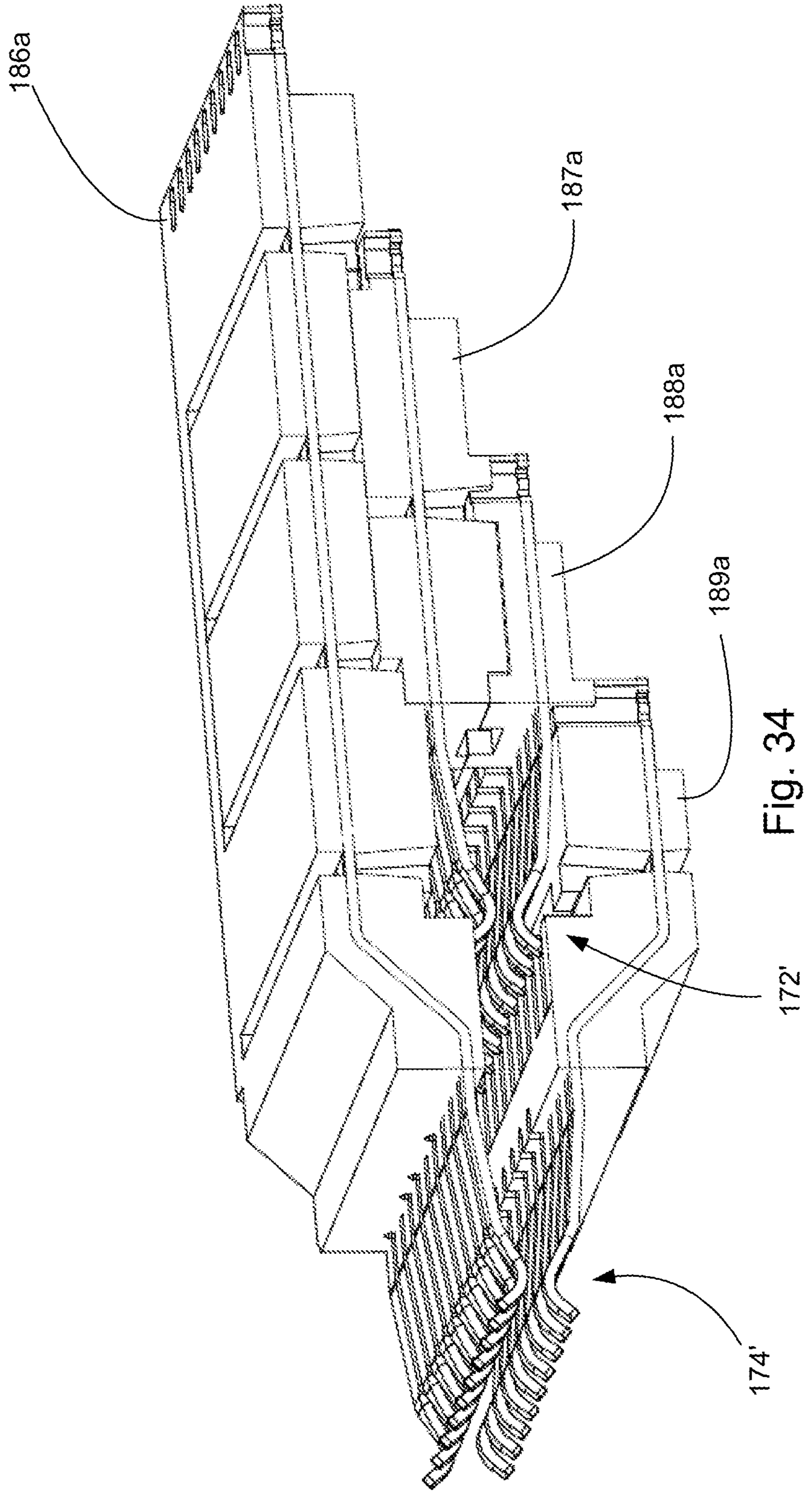
FIG. 34 illustrates a perspective view of a cross section of a module taken along line 34-34 in FIG. 30
Figure 35:
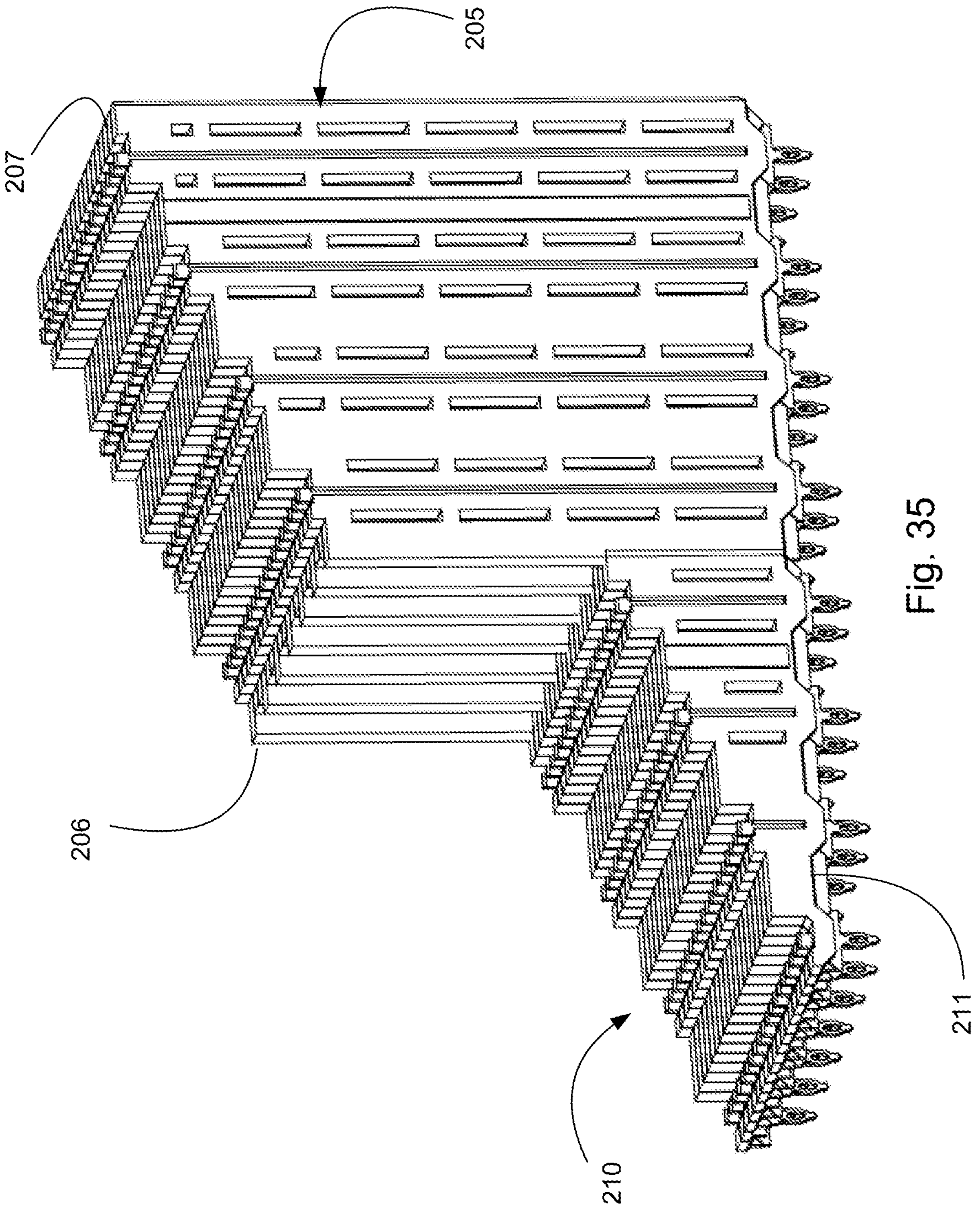
FIG. 35 illustrates a perspective view of two vertical modules.
Figure 36:
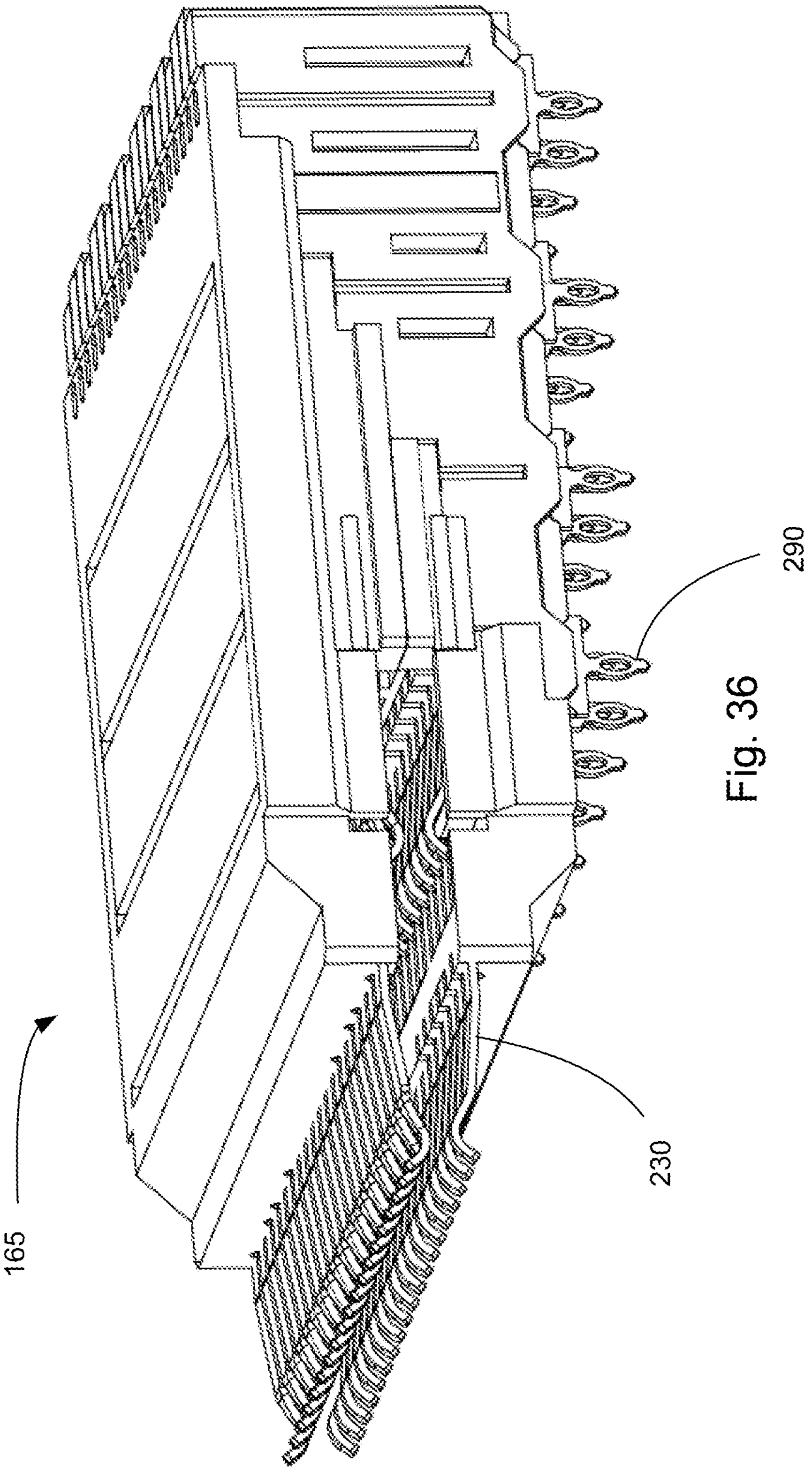
FIG. 36 illustrates a perspective view of an embodiment of a module and a vertical module.
Figure 37:
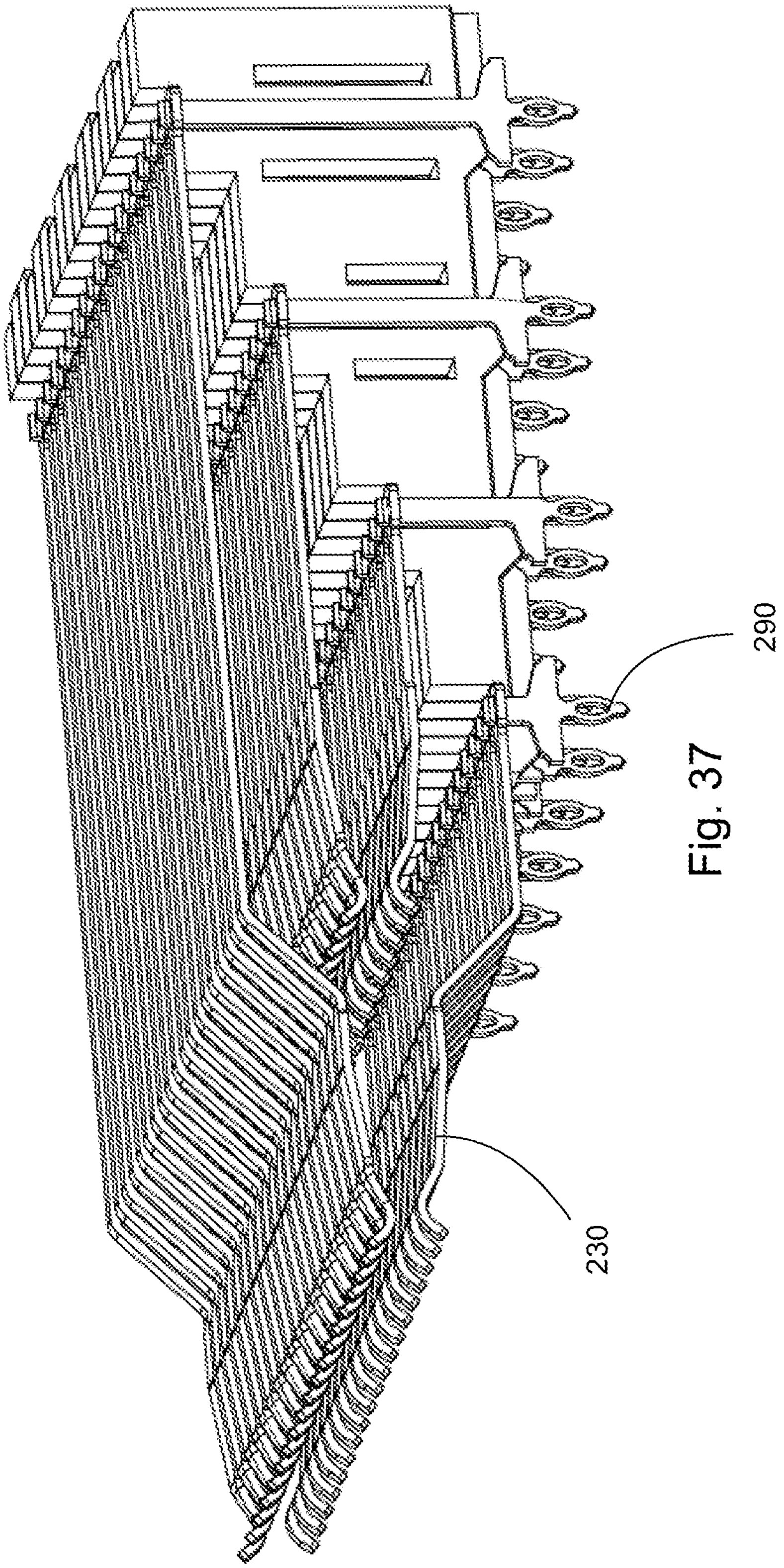
FIG. 37 illustrates a simplified perspective view of the embodiment depicted in FIG. 36.
Figure 38:
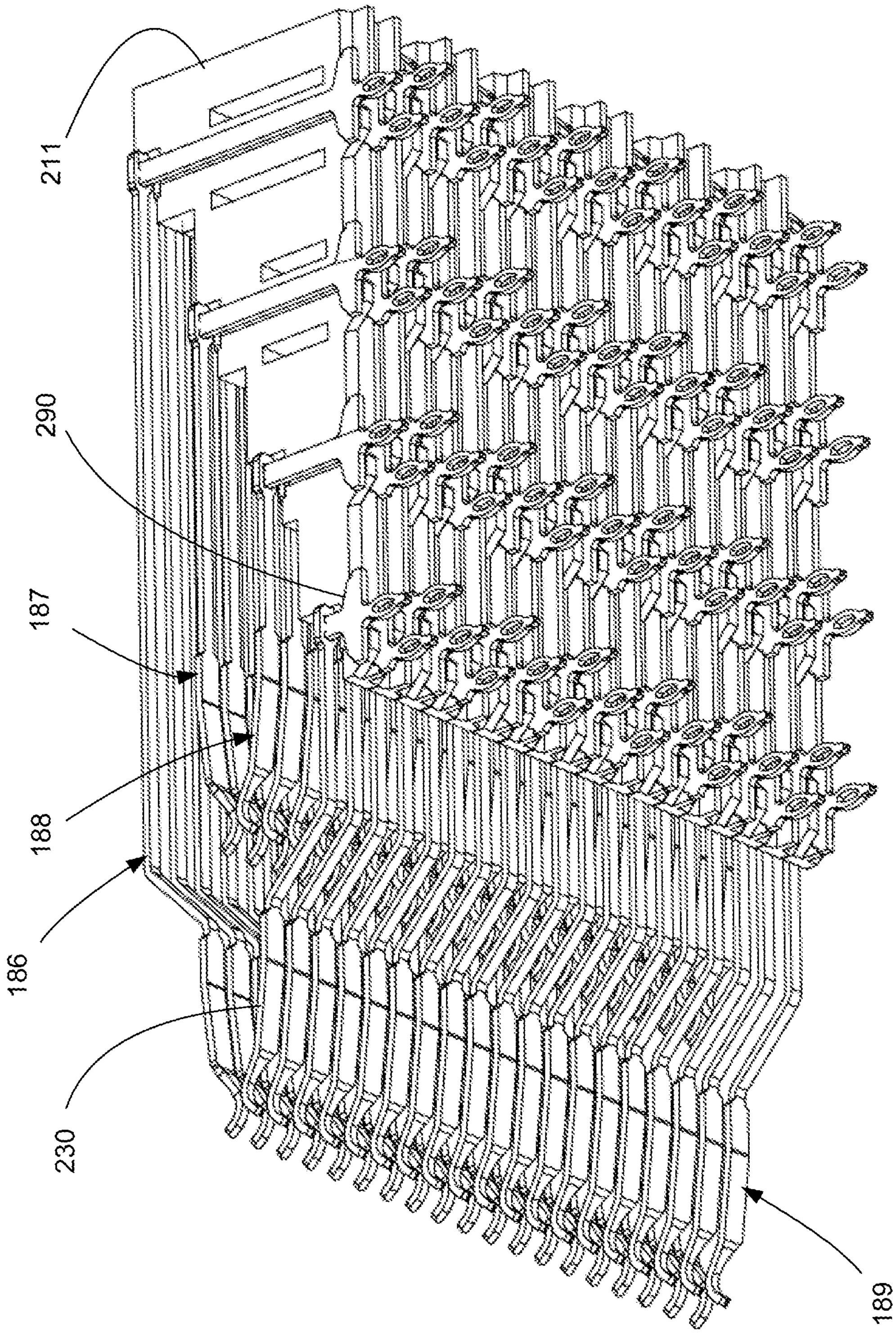
FIG. 38 illustrates another perspective view of the embodiment depicted in FIG. 37.
Figure 39:
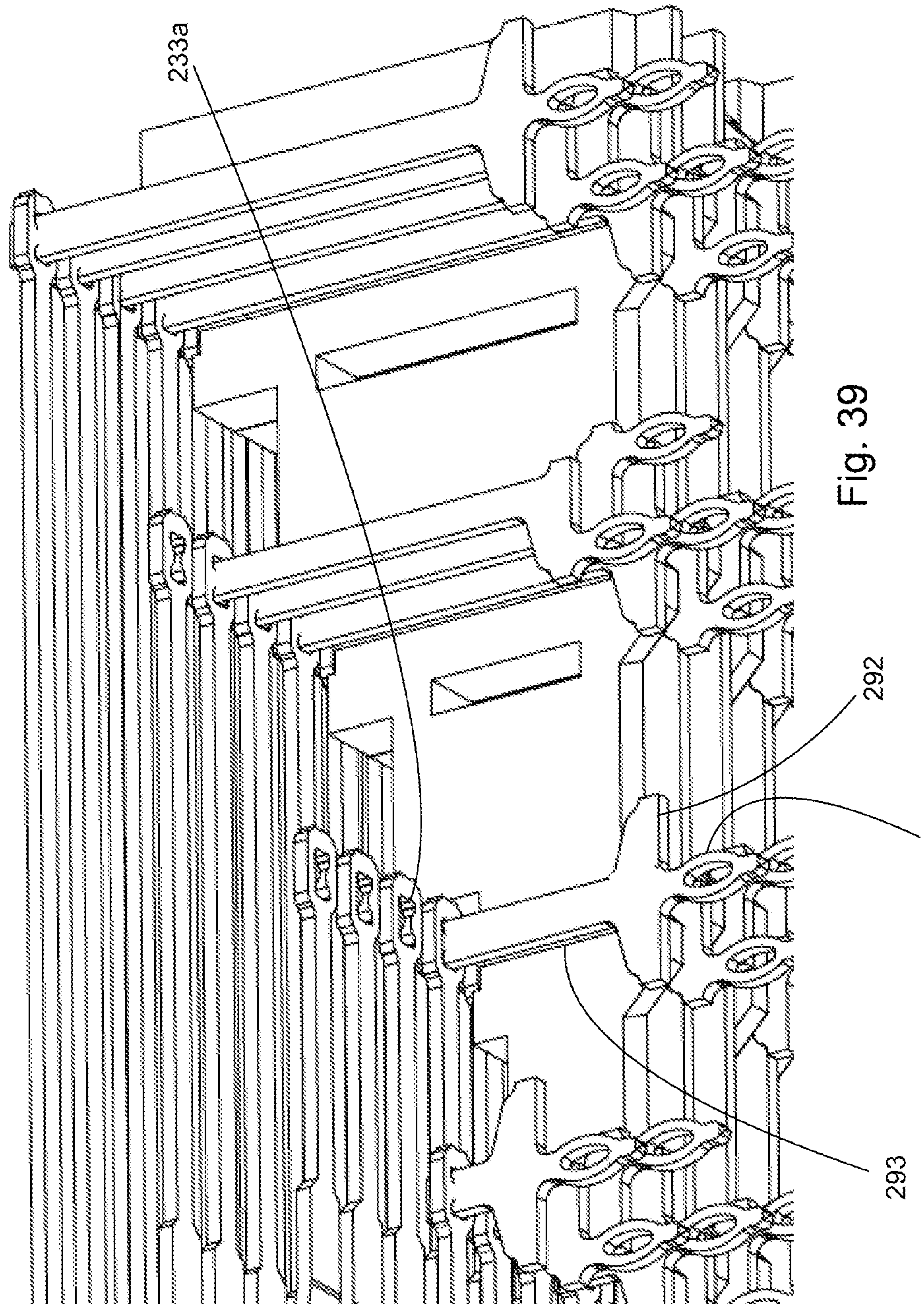
FIG. 39 illustrates an enlarged perspective view of the embodiment depicted in FIG. 38.
Figure 40:
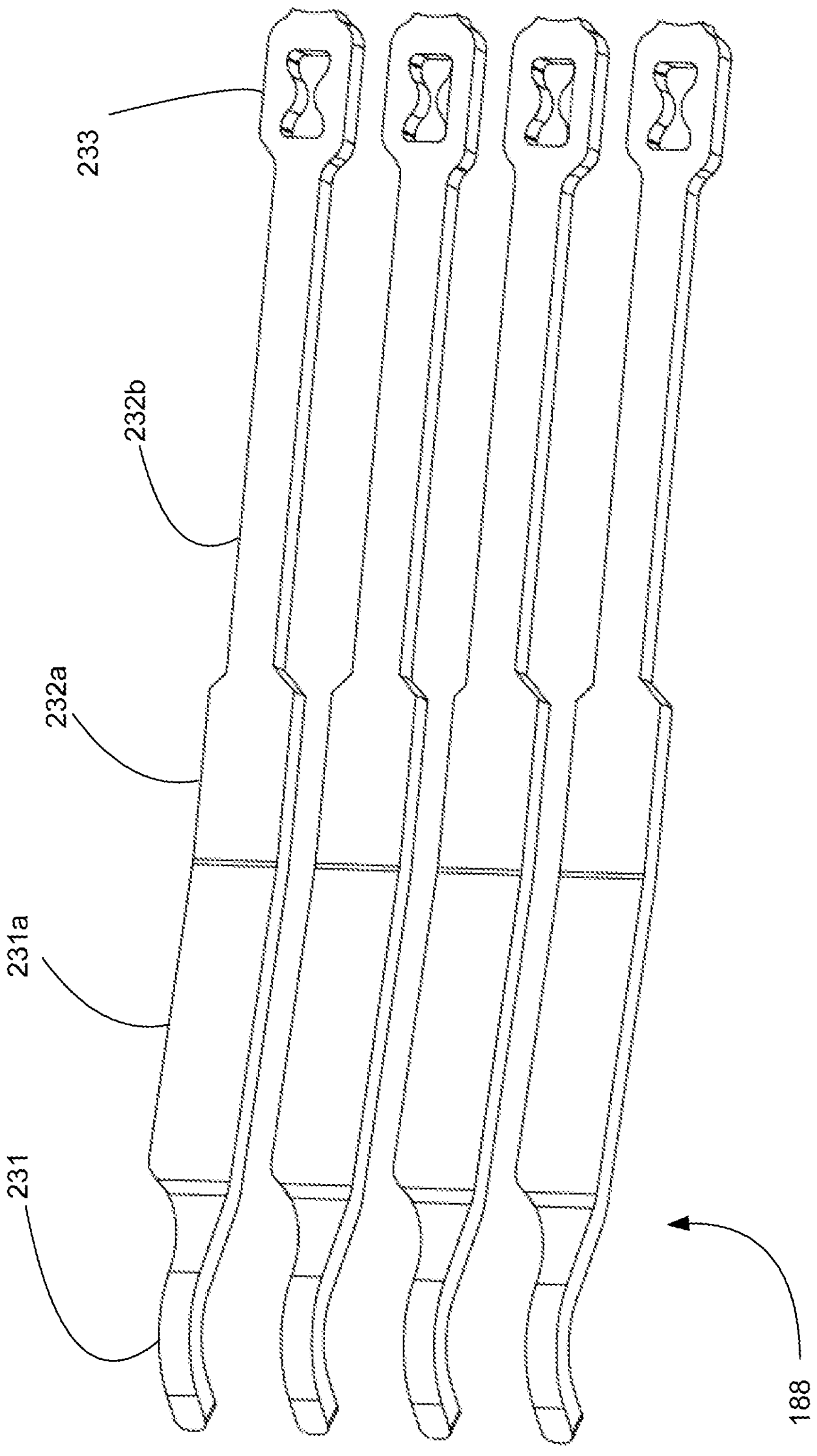
FIG. 40 illustrates a perspective partial view of an embodiment of a terminal row.
Figure 41:
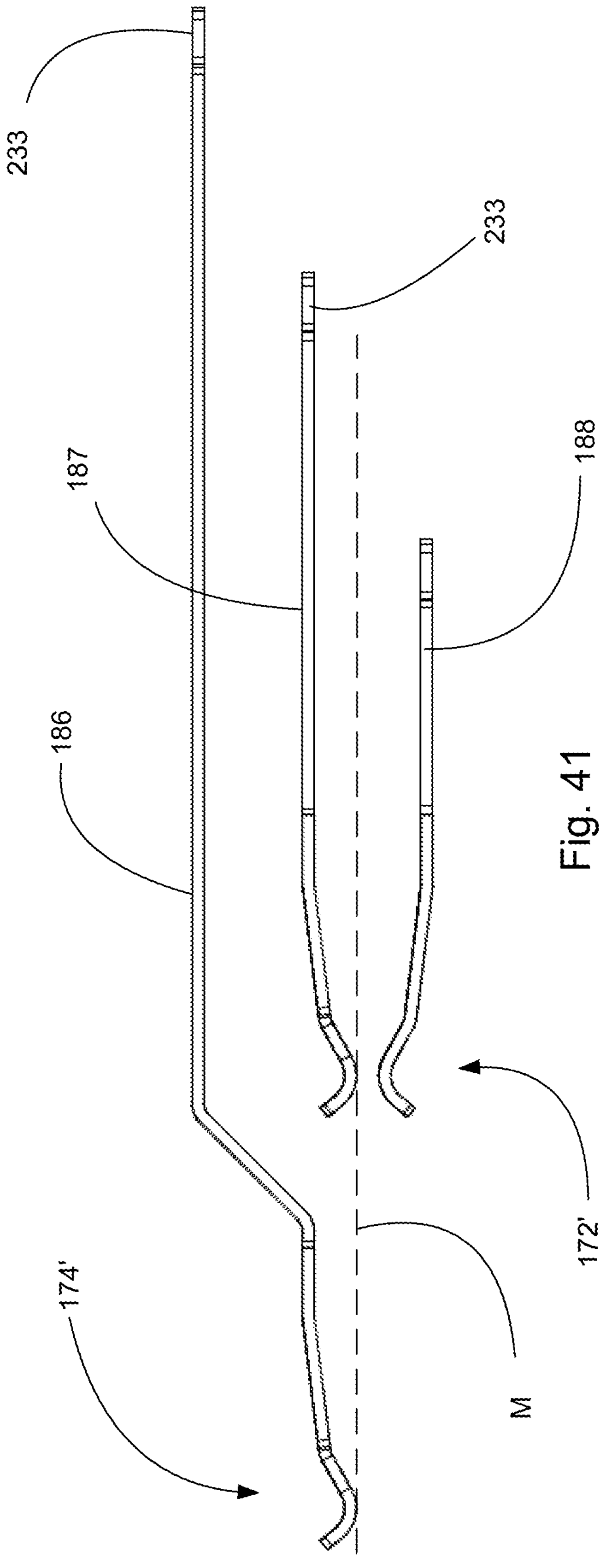
FIG. 41 illustrates a perspective partial view of terminals rows engaging a mating surface.

FIG. 19 illustrates two differential pairs 229*a*, 229*b* engaging the second pad row 174 and first pad row 172, respectively. As can be appreciated from the Figs., the terminals supported by the frames include cantilevered portions 221 and supported portions 223. The terminal row 161 (and the terminal row 164*a*) also includes an angled portion 222 that allows the cantilevered portion 221 to be positioned so that it can engage a mating blade while allowing the supported portion 223 to be positioned a suitable distance from the terminals row 162 supported by the frame 162*a*. Thus, as can be appreciated from FIGS. 20-21, when second terminal row 182 is position on pad row 72, first terminal row 181 is positioned on second pad row 74. A break exists between the third pad row 76 and first pad row 72 and that break can form a pad gap 73. In an embodiment, a vertical plane D positioned at the intersection between the angle portion 222 and the cantilevered portion 221 and a vertical plane F positioned at the intersection between the angled portion 222 and the supported portion 223 defined a horizontal space and a vertical plane E aligned with the pad gap 73 is positioned in that space between the vertical place D and the vertical place F. Preferably a vertical plane G aligned with a contact point between the first pad row and the second terminal row will be positioned outside of that horizontal space. It should be noted that both connection regions have contact points G, G' and as depicted the angled portion 222 is between the contact points G, G'.

As can be appreciated, the connector 150 includes a first card slot 331 aligned with the top port 110 and a second card slot 332 aligned with the bottom port 115. The card slots 331, 332 are recessed away from the front face 116, in an embodiment the cage has a length L and the cards slots are recessed a distance that is at least ⅓ L. The connector also includes a top air path 345 that provides for a ventilation path in the top port. In order to improve cooling in the bottom port 115, a center member 340 is provided. The center member 340 can be positioned between a first nose portion 320*a* that defines the first card slot 331 and a second nose portion 320*b* that defines the second card slot 332. The center member 340 include outer walls 340*a*, 340*b* that each include side vents 342, the center member 340 further includes a center wall 341 that helps split and direct the air passing through the divider 190 toward the two outer walls 340*a*, 340*b*. Because the outer walls 340*a*, 340*b* are recessed in compared to the cage, the space between the outer walls 340*a*, 340*b*, the side walls 135 and the shoulders 321, 322 of respective nose portions 320*a*, 320*b* creates an air channel 344 that allow air to flow past the connector 150 and out through the rear vents 139.

The top air path 345 accepts a rear section 346 that can be mounted to the top air path 345 and extends the air path toward the rear wall 138. The second nose portion 320*b* can be connected to back bracket 352, which can help provide for additional rigidity. It should be noted however, that the first nose portion 320*a* and second nose portion 320*b* do not need to be a single structure and thus can be separately attached to the respective module and supported by the center member 340. As can be appreciated, the depicted nose portions 320*a*, 320*b* include terminal grooves 326 that help support the contacts with a comb-like structure. While terminal grooves 326 are not required it is beneficial to provide them for the connection region that makes the first contact with a mating blade being inserted in the I direction.

In order to mount the modules 160, 165 on a circuit board, vertical modules 205, 210 are provided. The depicted vertical modules provide a stepped configuration, as can be appreciated from FIG. 30, and allow for terminals in wafers 206, 207, 211 to engage the tails of terminals rows supported by the frames.

It should be noted that while a stacked configuration is shown, a single port configuration is also contemplated. For example, the module 165 and the vertical module 210 could be used by themselves to provide a single port design (as compared to a stacked configuration). In such a configuration a single nose portion could be used and the center module could be omitted. It should also be noted that while a press-fit configuration is depicted, a version design for SMT mounting is also contemplated and within the scope of the disclosure as a person of skill in the art would generally be able to replace a standard press-fit tail with an SMT tail.

Regardless of the mounting type, assuming there is a mounting to circuit board, terminals 230 are connected to vertical terminals 290. The depicted vertical terminals 290 include a tail 291, a shoulder 292 and a vertical riser 293 that is configured to engage the tail 233. As depicted, the engagement is an interference fit between the vertical riser 293 and an aperture 233*a*.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

I claim:

1. A receptacle assembly, comprising:

a cage defining a port, the cage comprising a front face, a top wall, a plurality of side walls, and a rear wall; and a connector positioned in the cage, the connector comprising a card slot aligned with the port, a first row of opposing contacts, and a second row of opposing contacts, wherein:

the card slot is recessed in the port rearward of the front face, the first row of opposing contacts are configured to mate with opposing pads in a first connection region, the second row of opposing contacts are configured to mate with opposing pads in a second connection region positioned rearward of the first connection region, the first row of opposing contacts are provided by a first set of terminals and the second row of opposing contacts are provided by a second set of terminals, the first set of terminals comprises a top row of terminals and a bottom row of terminals, the top row of terminals is supported by a first frame, at least one terminal among the top row of terminals comprising a first supported portion, a first angled portion, and a first cantilevered portion, the first frame extending over the first supported portion and the first angled portion, the bottom row of terminals is supported by a second frame, at least one terminal among the bottom row of terminals comprising a second supported portion, a second angled portion, and a second cantilevered portion, the second frame extending over the second supported portion and the second angled portion, and the first frame and the second frame are separate components.

2. The receptacle assembly of claim 1, wherein the first cantilevered portion starts forward of the second connection region.

3. The receptacle assembly of claim 2, wherein the first and second sets of terminals comprise tails that are configured to allow the receptacle assembly to be mounted on a circuit board in a press-fit manner.

4. The receptacle assembly of claim 2, wherein the first and second sets of terminals comprise tails, and the tails of the second set of terminals are positioned between the tails of the first set of terminals.

5. The receptacle assembly of claim 1, wherein the top row of terminals is connected to top row tail portions and the bottom row of terminals is connected to bottom row tail portions, and the top row tail portions are supported by a third frame and the bottom row tail portions are supported by a fourth frame.

6. The receptacle assembly of claim 5, wherein the first frame and the second frame extend in a front-to-back direction and the third frame and the fourth frame extend in a top-to-bottom direction.

7. The receptacle assembly of claim 6, wherein the third frame is positioned rearward of the fourth frame.

8. The receptacle assembly of claim 1, wherein the top row of terminals is electrically coupled to top row tail portions and the bottom row of terminals is electrically coupled to bottom row tail portions, the top row tail portions are supported by a third frame and the bottom row tail portions are supported by a fourth frame, and the third frame and the fourth frame are separate components.

9. A receptacle assembly, comprising:

a cage defining a port, the cage comprising a front face, a top wall, a plurality of side walls, and a rear wall; and a connector positioned in the cage, the connector comprising a first set of terminals and a second set of terminals, wherein:

the first set of terminals comprises opposing contacts configured to mate with opposing pads on a mating blade in a first connection region, the second set of terminals comprises opposing contacts configured to mate with opposing pads on the mating blade in a second connection region, the second connection region is positioned rearward of the first connection region in the cage, and the first connection region is positioned rearward of the front face of the cage, the first set of terminals comprises a top row of terminals and a bottom row of terminals, the top row of terminals is supported by a first frame, at least one terminal among the top row of terminals comprising a first supported portion, a first angled portion, and a first cantilevered portion, the first frame extending over the first supported portion and the first angled portion, the bottom row of terminals is supported by a second frame, at least one terminal among the bottom row of terminals comprising a second supported portion, a second angled portion, and a second cantilevered portion, the second frame extending over the second supported portion and the second angled portion, and the first frame and the second frame are separate components.

10. The receptacle assembly of claim 9, wherein:

the top row of terminals is supported in a cantilevered manner by the first frame, and the first cantilevered portion starts forward of the second connection region.

11. The receptacle assembly of claim 10, wherein:

the first supported portion and the first angled portion are embedded in the first frame, and the first cantilevered portion is not embedded in the first frame.

12. The receptacle assembly of claim 11, wherein each terminal among the top row of terminals comprises an angled portion embedded in the first frame.

13. The receptacle assembly of claim 9, wherein the bottom row of terminals is supported in a cantilevered manner by the second frame.

14. The receptacle assembly of claim 13, wherein:

the second supported portion and the second angled portion are embedded in the second frame, and the second cantilevered portion is not embedded in the second frame.

15. The receptacle assembly of claim 14, wherein each terminal among the bottom row of terminals comprises an angled portion embedded in the first frame.

16. The receptacle assembly of claim 9, wherein:

the top row of terminals is supported in a cantilevered manner by the first frame so as to define the first cantilevered portion, and the first cantilevered portion starts forward of the second connection region.

17. The receptacle assembly of claim 16, wherein the first cantilevered portion is not embedded in the first frame.

18. The receptacle assembly of claim 9, wherein:

the bottom row of terminals is supported in a cantilevered manner by the second frame so as to define the second cantilevered portion, and the second cantilevered portion starts forward of the second connection region.

19. The receptacle assembly of claim 18, wherein the second cantilevered portion is not embedded in the second frame.

20. The receptacle assembly of claim 9, wherein the first and second sets of terminals comprise eye-of-the-needle tails that are configured to allow the receptacle assembly to be mounted on a circuit board in a press-fit manner.

* * * * *